United States Patent [19]
Ishiharada et al.

[11] Patent Number: 6,030,108
[45] Date of Patent: Feb. 29, 2000

[54] WATERPROOF LIGHTING APPARATUS

[75] Inventors: Minoru Ishiharada, Tokyo; Itsuo Tanuma, Saitama-ken; Kazuo Naito, Kanagawa-ken; Yasuhiko Matsumuro, Tokuyo; Takao Aoki, Kanagawa-ken; Kiyoshi Koyama, Kanagawa-ken, all of Japan

[73] Assignee: Bridgestone Corporation, Tokyo, Japan

[21] Appl. No.: 08/103,226

[22] Filed: Aug. 9, 1993

[30] Foreign Application Priority Data

| Aug. 7, 1992 | [JP] | Japan | 4-232840 |
| Aug. 21, 1992 | [JP] | Japan | 4-245612 |
| Aug. 25, 1992 | [JP] | Japan | 4-248594 |

[51] Int. Cl.$^7$ ........................................ F21V 8/00
[52] U.S. Cl. .......................... 362/562; 362/96; 362/101; 362/559; 362/582; 385/123
[58] Field of Search .............................. 362/32, 293, 101, 362/96, 559, 582, 562; 385/123, 125, 100

[56] References Cited

U.S. PATENT DOCUMENTS

| 3,641,332 | 2/1972 | Reick et al. | 362/582 |
| 3,995,934 | 12/1976 | Nath | 385/125 |
| 4,422,719 | 12/1983 | Orcutt | 385/123 |
| 4,466,697 | 8/1984 | Daniel | 385/123 |
| 4,749,126 | 6/1988 | Kessener et al. | 239/12 |
| 4,789,989 | 12/1988 | Stern et al. | 362/32 |
| 4,812,011 | 3/1989 | Tatsukami et al. | 385/123 X |
| 4,901,922 | 2/1990 | Kessener et al. | 362/96 X |
| 5,067,059 | 11/1991 | Hwang | 362/101 |
| 5,333,227 | 7/1994 | Ishiharada et al. | 385/100 |

*Primary Examiner*—Stephen Husar
*Attorney, Agent, or Firm*—Sughrue, Mion, Zinn, Macpeak & Seas, PLLC

[57] ABSTRACT

The light transmission hose included in the waterproof lighting apparatus according to the present invention is of a watertight structure, so it can easily be used as laid in or on water without any special protective means. Since the light source is installed in a location apart from water, it can be easily maintained and lamp replacement is also easy. By selecting a desired one of the kinds of light source, the illumination can be changed, resulting in a great effect of illumination. If provided with a powerful light source, the waterproof lighting apparatus according to the present invention can be used for warning any hazardous area to walkers, bicycle riders, car drivers, ships, aircraft and the like vehicles. Even if the lighting apparatus is located far away, the light from the light-emitting portion permits the walker or vehicle driver to readily be aware of a hazardous area.

5 Claims, 33 Drawing Sheets

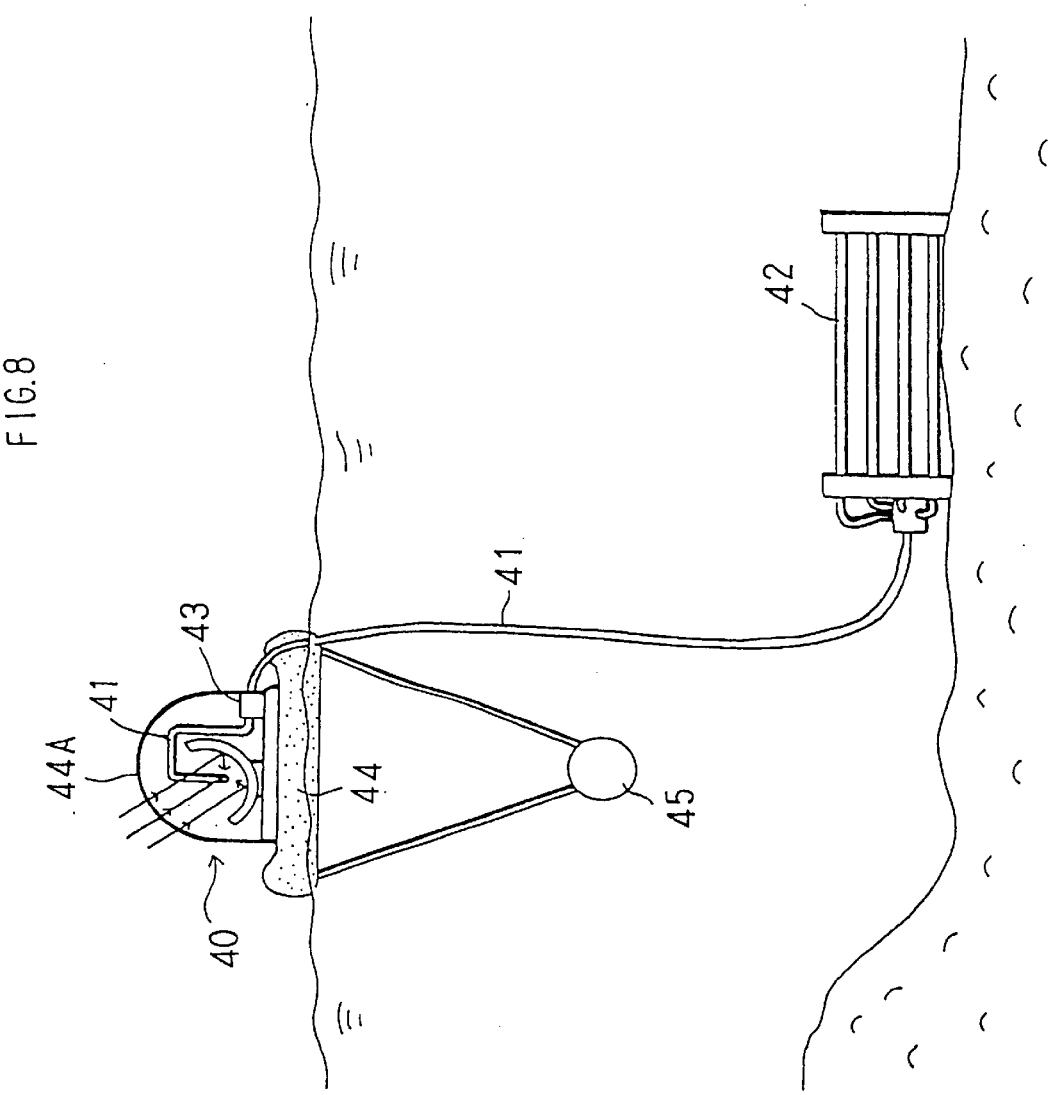

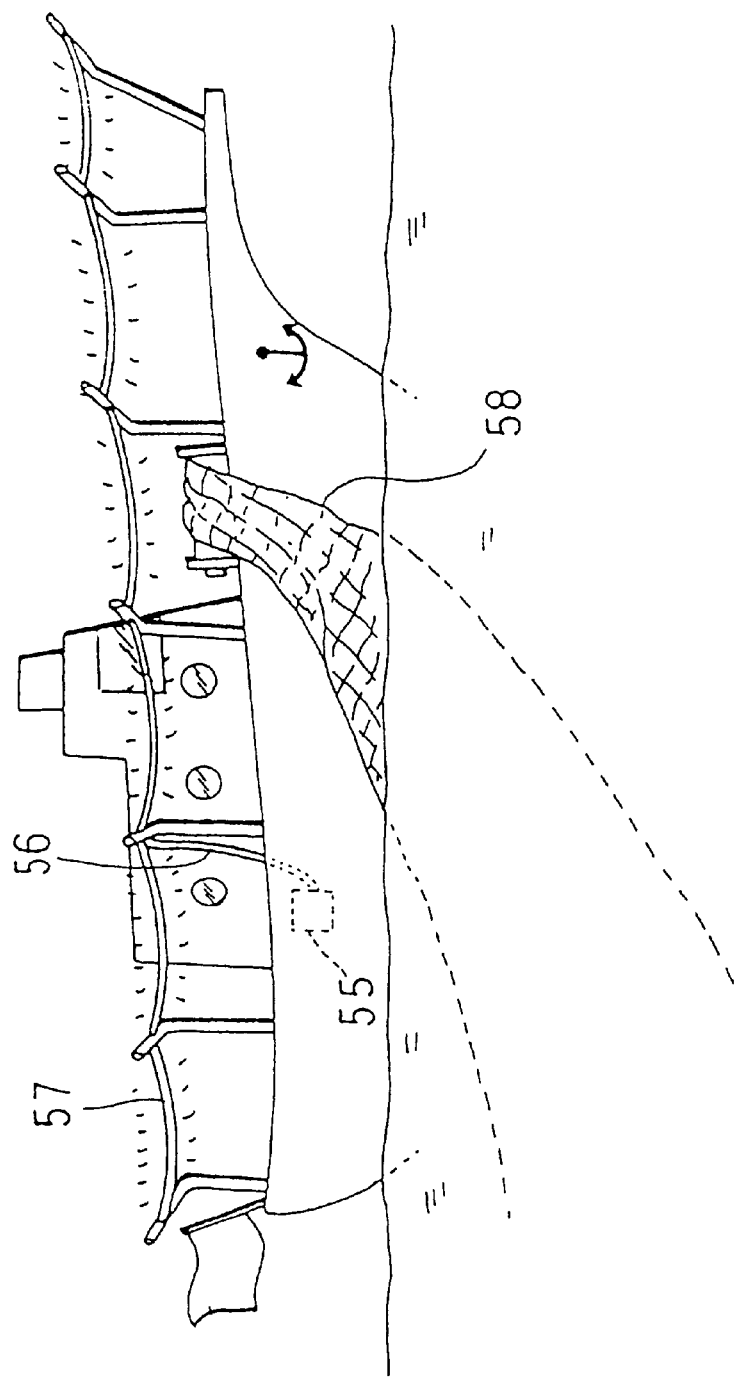

WATERPROOF LIGHTING APPARATUS

BACKGROUND OF THE INVENTION

1. Field of the Invention

The present invention relates to a waterproof lighting apparatus usable to project light into or onto water for the purpose of decoration or illumination to provide light a signal for the safe run and operation of automobiles, aircraft and pedestrian, and usuable for use in connection with traffic for automobiles, railway vehicles, etc.

2. Description of the Prior Art

A wide variety of lighting apparatus has been developed to the users' tastes and demands, and they are used especially indoors. Also the lighting apparatus include outdoor-use, for street lighting, signal lighting, etc. The lighting apparatus have been designed to be submergible by being provided with a special waterproof protector to keep the lamp insulated from water.

Outdoor-use lighting apparatus which is usable in various a variety of fields of industry is in demand. However, the application of the outdoor-use lighting apparatuses is greatly limited because, for example, (1) the lamp has to be replaced and (2) the lamp has to be protected against a leakage when used in rain or water. Such requirements are not applicable only to the outdoor-use lighting apparatus but also to lighting apparatuses to be used under and on water.

SUMMARY OF THE INVENTION

Accordingly, the present invention has an object to provide a waterproof lighting apparatus suitably usable outdoors, under or on water (sea) and easy to install and maintain.

According to the present invention, the light emitted from a light source is incident massively and efficiently upon one end of a light transmission hose composed of a core having a high index of refraction and a clad having a low index of refraction and which is connected to the light source, repeatedly reflected at the boundary between the circumferential surface of the clad and the core and thus led to a light-emitting portion of the light transmission hose, which is located in a desired outdoor, under- and/or on-water lighting place, and finally projected from the light-emitting portion of the hose. Even in case the lighting apparatus according to the present invention is used, for example, under or on water, the light transmission hose can be easily installed in or on water with no special protector provided thereon. Since the light source is placed in a location apart from water, the lamp can be easily replaced and the maintenance thereof is also easy. Further, the illuminating condition can be changed by switching the kind of light source from one to another, thus providing a great effect of illumination.

According to one aspect of the present invention, a waterproof lighting apparatus, comprising, a light source provided outdoors or in a watertight housing, a light transmission hose consisting of a long watertight clad made of a flexible synthetic resin and a viscous liquid, solid, sol or gel core of which the index of refraction is greater than that of the clad, the hose being connected at the base end thereof to the light source and extended outdoors, into and/or onto water to transmit the light from the light source to the other end thereof, the light from the light source being emitted or projected from a light-emitting portion at at least one of the end of the clad, a part of and all the lateral side of the clad to the outdoors, into and/or onto water.

According to another aspect of the present invention, a waterproof lighting apparatus wherein the light-emitting portion of the clad is provided atop a fountain equipment.

According to still another aspect of the present invention, a waterproof lighting apparatus wherein the light-emitting portion provided along a part of or all of the lateral side of the clad is used for defining the swimming courses in a swimming pool.

According to still another aspect of the present invention, a waterproof lighting apparatus wherein a continuous or intermittent light of a predetermined wavelength of which walkers or vehicle drivers can readily be aware is emitted from the light source, the warning light is guided from the light source through the light transmission hose to a predetermined area, for example, a hazard or hazardous area, and the continuous or intermittent light is emitted from the light-emitting portion connected to the light transmission hose.

According to still another aspect of the invention, a waterproof lighting apparatus wherein the light-emitting portion is disposed along the circumferential edge of a safe area adjoining a hazardous area to illuminate the boundary between the hazardous safe areas.

According to the still another aspect of the present invention, a waterproof lighting apparatus further comprising a color selecting means of controlling the operation of a color filter which selectively passes lights of different wavelength emitted from the light source, the light of a predetermined wavelength selectively passes by the color selecting means being led through the light transmission hose to the light-emitting portion in a panel provided at a certain height from the ground to emit the light from the light-emitting portion.

According to the still another aspect of the present invention, a waterproof lighting apparatus wherein the operation of the color filter which selectively passes lights of at least red and/or blue in color among the lights of predetermined wavelength from the light source is controlled by the color selecting means so that the lights are used as signals for transportation or traffic in connection with automobiles, railways, etc.

BRIEF DESCRIPTION OF THE DRAWINGS

FIG. 8 shows a fourth embodiment of the waterproof lighting apparatus according to the present invention, showing the application thereof to an aquafarm;

FIG. 9 is a side elevation of a fifth embodiment of the waterproof lighting apparatus according to the present invention, showing the use thereof on a fishing boat;

DETAILED DESCRIPTION OF THE PREFERRED EMBODIMENTS

The preferred embodiments of the present invention will be described herebelow with reference to the drawings.

A. Lighting Apparatus for Use In, On, With Above and/or Around Water.

(First Embodiment)

Figure 1:
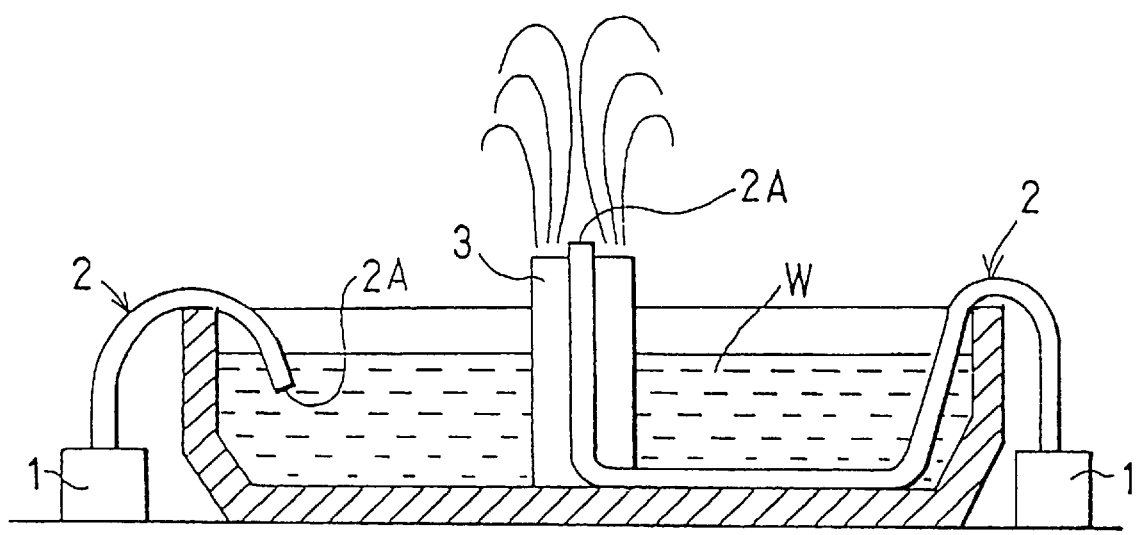
FIG. 1 is a schematic sectional view showing one embodiment of the present invention applied to a fountain.

FIG. 1 shows an example of the application of the waterproof lighting apparatus according to the present invention for illumination of an artificial pond with a fountain (which will be referred to as a "fountain" herebelow). In this embodiment, the lighting apparatus according to the present invention is used in two manners. Each of two sets comprises a light source 1 and a light transmission hose 2 connected at one end thereof to the light source 1 and having a light-emitting portion 2A provided at the other end thereof. The fountain has a water sprayer 3 provided in the center thereof. In each set, the light source 1 is installed at a position apart from water W. As shown in FIG. 1, the light-emitting portion 2A of the light transmission hose 2 of one of the two sets is submerged and directed toward the bottom of the fountain, while the light-emitting portion 2A of the other set is so installed along the sprayer 3 as to vertically rise and be nearly flush with the top end of the sprayer 3. Thus, the former light-emitting portion 2A illuminates water W, while the latter one 2A illuminates the jet or spray of water rising from the sprayer 3.

The light source 1 in this embodiment is an ordinary lamp which continuously emits a light, but as will be described later, the light can be intermittenly emitted from the light-emitting portion 2A and also various filters can be used to provide various kinds of colored light.

Figure 2:
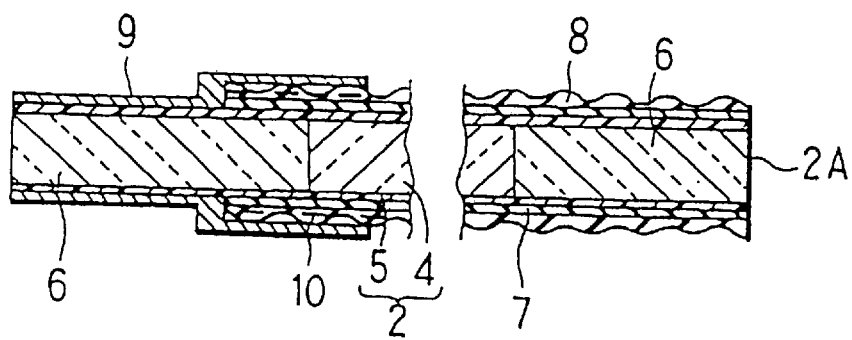
FIG. 2 is a sectional view of the light transmission hose used in the embodiment shown in FIG. 1.

The light transmission hose 2 of the waterproof lighting apparatus according to the present invention used with the fountain as shown in FIG. 1 is constructed as will be discussed below. As seen from FIG. 2, a core 4 in a viscous-liquid, solid or gel state is housed in a watertight tublar clad 5 made of a flexible high polymer by filling the core 4 into the clad 5, or by first extruding the core 4 and then covering the core 4 with the clad 5, or in any other suitable manner. The index of refraction of the clad 5 is lower than that of the core 4.

In case the light transmission hose 2 uses a viscous-liquid core 4, the clad 5 is provided with transparent windows 6 at both ends thereof. The outer circumference of the clad 5 is covered with a sheath 7. The sheath 7 has a protective tube 8 provided on the outer circumference thereof.

The light transmission hose 2 has a base 9 fixed on one end thereof at which the hose 2 is to be connected to the light source 1. Also a protective tape 10 is wound on the boundary between the clad 5 and protective tube 8 inside the base 9. When the light source 1 and transmission hose 2 are assembled together, the base 9 is inserted into the light source 1. The end face of the transparent window 6 at the other end of the hose 2 serves as the aforementioned light-emitting portion 2A. Thus, the light incident upon the one end of the hose 2 from the light source 1 is guided through the hose 2 and emitted from the light-emitting portion 2A.

More particularly, in case the core 4 is a viscous-liquid one, it should preferably be made of a material selected from the polyols such as polyethyleneoxide, polypropylene oxide, glycerine, etc., the polyol esters, the polyol ethers, the ester phosphates such as chloroethyl phosphate, trioctyl phosphate, etc., fluorine oil, silicon oil. polyisobutylene, polysiloxane denatured polyether, solution of an inorgatic salt, polymer solution in which a polymer is solved in a suitable solvent, and the like. The core materials may be used alone or in a mixture of two or more, whereby any desired optical scattering property can be obtained.

In case the core 4 is a solid one, it should be made of a plastic, elastomer, thermoelastomer or the like. Also, the core 4 may be made of a settable liquid such as an epoxy resin, liquid silicon, liquid polybutadiene or the like. Further, the solid core 4 may be made of a high polymer selected from among a polyethylene-vinyl acetate copolymer, styrene-butadiene-styrene block copolymer, butyl rubber, acryl rubber, EPDM, silicon rubber, fluoro rubber, polybutylene, polyisobutylene and the like. Furthermore, the solid core 4 may be made of a polymer such as ester acrylate or ester methacrylate or a copolymer of them, in which the alcohol acidic radical should preferably be an alkyl group such as methyl group, ethyl group, butyl group, dodecyl group, stearyl group, lauryl group or the like because of their high thermal resistance. Similarly, the solid core 4 may be made of an ester of acrylate with a polyfunctional alcohol such as ethylene glycol, triethylene glycol, polyethylene glycol, trimethyl propane or the like. The material of the solid core 4 may be a high-molecular material solved and swollen in an oil, plasticizer, solvent or the like. When appropriately cross-liked, such material will improve the properties of the core 4 such as thermal resistance, etc.

The clad 5 is made of a transparent inorganic or organic material. The material should be selected from among glass, quartz, alumina, polyethylene, polypropylene, polyester, polyamide, silicon rubber, polycarbonate, polyvinyl chloride, ethylene tetrafluoride-polypropylene hexafluoride copolymer, ethylene tetrafluoride-fluoroalcoxyethylene or the like. Especially, the material of the hollow tubular clad 5 should preferably be made of a material which is flexible, can be molded in to a tube and has a low index of refraction, such as plastic, elastomer or the like.

More particularly, the material should be selected from among polyethylene, polypropylene, polyamide, polystyrene, ABS, polymethacryl methacrylate, polycarbonate, polyvinyl chloride, polyvinylidene chloride, polyvinil acetate, polyethylene-vinyl acetate copolymer, polyvinyl alcohol, polyethylene-polyvinyl alcohol copolymer, fluorocarbon resin, silicon resin, gnatural rubber, polyisoprene rubber, polybutadiene rubber, styrene-butadiene copolymer, butyl rubber, butyl rubber halogenide, chloroprene rubber, acryl rubber, EPDM, acrylonitryl-butadiene copolymer, fluoro rubber, silicon rubber and the like. Among these materials, the silicon-family polymers and fluorine-family polymers of which the index of refraction is low should preferably be used as the material for the clad 5. More specifically, they include silicon-family polymers such as polydimethylsiloxane polymer, polymethylphenylsiloxane polymer, fluoro silicon polymer, etc. polytetrafluoro-ethylene (PTFE), ethylene polypropylene hexafluoride copolymer (FEP), ethylene tetrafluoride-perfluoroalcoxyethylene copolymer (PFE). polychlortrifluoroethylene (PCTFE), ethylene tetrafluoride-ethylene coplymer (ETFE), polyvinylidene fluoride, polyvinyl fluoride, vinylidene fluoride-ethylene chloride trifluoride copolymer, vinylidene fluoride-ethylene chloride trifluoride copymer, vinylidene fluoride-propylene hexafluoride copolymer, vinylidene fluoride-propylene hexafluoride-ethylene tetrafluoride terpolymer, ethylene tatrafluoride propylene rubber, fluorine-family thermoplastic elestomer, etc. These materials may be used in a single kind or in two or more kinds as blended together. The clad 5 may be of a single wall structure or multiple-wall structure. Further, only the inner wall of the clad 5, which is in contact with the core 4, may be smoothed by coating or double-extrusion molding.

The windows 6 of the light transmission hose 2 are made of a transparent material. They serve to seal the core 4 inside the clad 5 and should be capable of accepting the light incident from the light source 1 and emitting it out of the light transmission hose 2. Therefore, the windows 6 should preferably be made of quartz, crown glass, flint glass, chalcogens glass, sapphire, crystal, polycarbonate, methacrylate resin, polyethyrene resin or the like.

The sheath 7 is made of a black rubber or the like which will not leak the light from the latteral side of the light transmission hose 2. The protective tube 8 is made of a rubber, stainless steel, resin or a similar material. The tube 8 should be flexible. In case the clad 5 is made of an opaque material, the light transmission hose 2 shown in FIG. 1 can be made without the sheath 7 and protective tube 8.

Therefore, in the first embodiment of the present invention, the light transmission hose 2 is connected at one end thereof to the light source 1 located apart from water W and the light-emitting portion 2A at the other end of the light transmission hose 2 is installed in or on water. As the light transmission hose 2 is waterproof the light transmission hose 2 can easily be installed in water. Even after the hose 2 is thus laid, the lamp or the like in the light source 1 can be replaced since the light source 1 is apart from water W. Namely, the apparatus is easy to maintain. As having previously been described, the illuminating condition can be changed by switching the kind of light source form one to another, selecting the light wavelength or by using a color filter, thereby providing a great effect of illumination. Also, the light transmission hose 2 is highly watertight and has a high efficiency of light transmission since it comprises the viscous-liquid, solid or gel core 4 housed in the flexible high-morecular clad 5.

(Second Embodiment)

Figure 3:
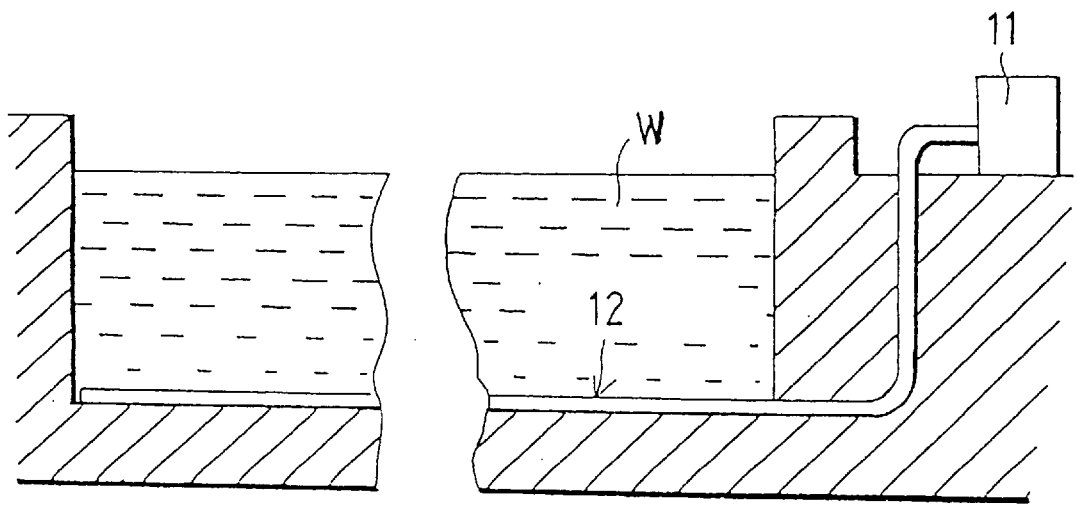
FIG. 3 is a schematic sectional view showing a second embodiment of the present invention applied to a swimming pool.
Figure 4:
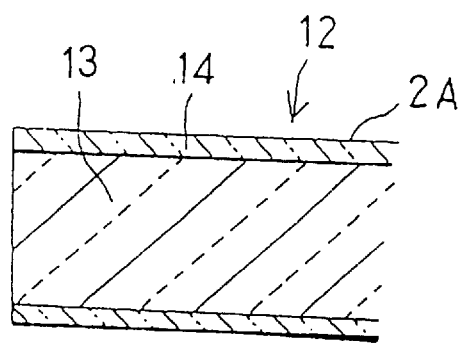
FIG. 4 is a sectional view of the light transmission hose used in the embodiment shown in FIG. 3.
Figure 5:
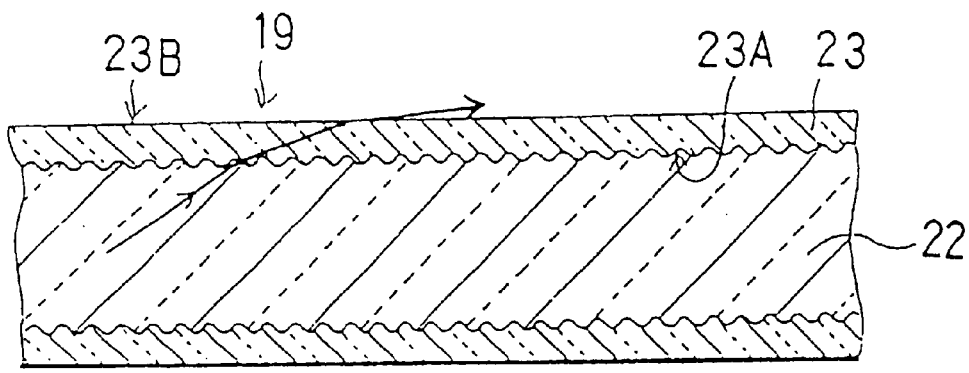
FIG. 5 is a sectional view of the light emission tube in the light-emitting portion according to the present invention.

In the second embodiment shown in FIG. 3, light transmission hoses 12 are used as laid on the bottom in swimming pool, each having a light-emitting portion along the length thereof, to indicate separated swimming courses. A light source 11 of this lighting apparatus is installed in a place apart from water W. As shown in FIG. 4, the light transmission hose 12 used in this embodiment may be composed of a core 13 housed in a clad 14 which is so transparent that the entire outer circumference of the hose 12 serves as the light-emitting portion. FIG. 5 shows a light emission tube 19, as a part of the light transmission hose 12, intended for emitting scattered rays of light. For an increased scattering of light, the light emission tube 19 may be composed of a core 22 made of a highly transparent material and a clad 23 made of a transparent material of which the index of referaction is lower than that of the core 22 and which has a fine irregularity formed on the inner circumference 23A thereof which is in contact with the core 22, as shown in FIG. 5. In the light emission tube 19, a part of the light delivered from the light transmission hose 2 covered with the sheath 7 and protective tube 8 as in the first embodiment travels through the core 22, transmitted through the clad 23 without being fully reflected at the inner circumference 23A and efficiently emitted out of an outer circumference 23B of the clad 23.

Figure 6:
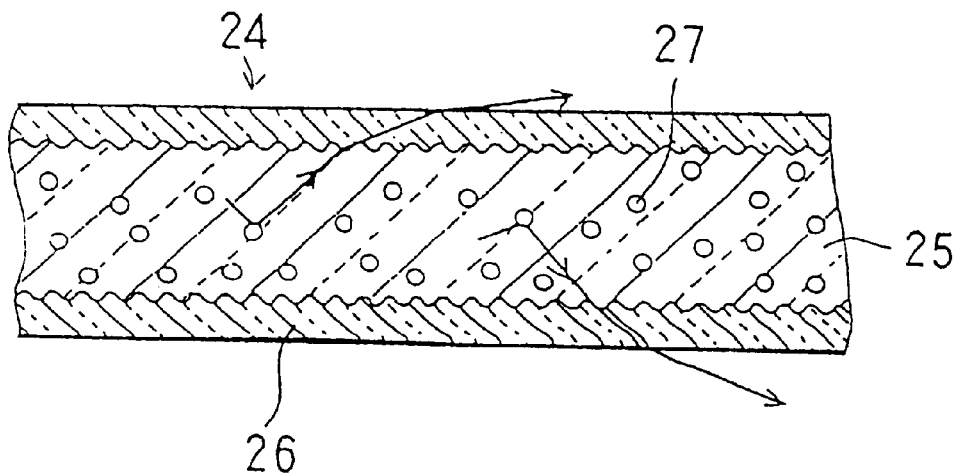
FIG. 6 is a sectional view of a variant of the light emission tube in the light-emitting portion.

FIG. 6 shows a variant of the light-emitting tube. This light emission tube 24 may be composed of a core 25 made of a viscous liquid material and in which many globular pieces 27 of which the outer surface is coated with a highly reflective layer are mixed, and a hollow cylindrical clad 26 in which the core 25 is filled. In this case, a more efficient emission of ultraviolet rays is assured. Also, the core 25 may be made of a transparent matrix or matrix material, same here after in which a transparent material of which the index of refraction is different from that of the matrix is diffused to provide an optically nonuniform structure of the core 25. Note that in this case the core 22 and clad 23 are made of the same materials, respectively, as those in the first embodiment.

The transparent matrix may be made of any of the following:

(1) Transparent plastic of polymethylmethacrylate, polystyrene, polycarbonate, CR-39, fluoro resin, silicon resin or the like (2) Elastomer of polyethylene-vinyl acetate copolymer, styrene-butadiene-styrene block copolymer, butyl rubber, acryl rubber, EPDM, silicon rubber, fluoro rubber, polybutane, polyisobutyrene or the like (3) Polymer of ester acylate or ester methacrylate or copolymer of them.

Also, the transparent matrix may be made of an ester of acrylate with a polyfuctional alcohol such as ethylene glycol, triethylene glycol, polyethylene glycol, trimethyl propane or the like.

The transparent material diffused in the matrix may be any of the following:

(1) Inorganic material such as glass or the like (2) The above-mentioned transparent resin, elstomer or polymerization/cross-linking precursor of them (3) Transparent silicon oil, fluoro oil, fluid paraffin, ethylene glycol, polybutene, polyisobutylene, ester-phosphate oil or the like.

The transparent material diffused in the transparent matrix may have the shape of powder, particle or fiber and may be in a bulk or liquid state.

The above-mentioned transparent material can be diffused in any of the following methods:

(1) The material is mixed and diffused in the transparent matrix by using a mixer, mixing roll, extruder or the like.

(2) After mixed by agitation in the polymerization or cross-linking precursor of the transparent matrix, the material is polymerized or cross-linked.

(3) Diffusion by solvent casting or swelling.

The light scattering material may be formed into a rod which works as the light-emitting tube or the like, also it may be formed into a place or any other desired shape which would be suitable to emit the light. The light may be emitted from a part of such a light-emitting portion as necessary.

Figure 7A:
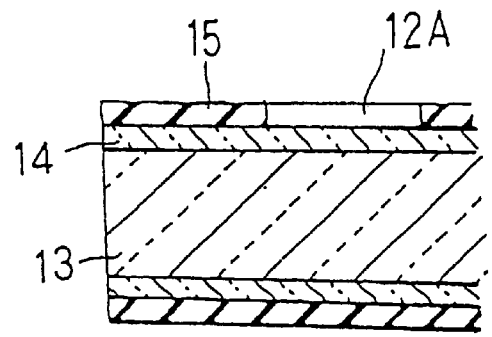
FIG. 7(A) is a sectional view of a variant of the light transmission hose used in the second embodiment shown in FIG. 3.

Otherwise, the clad 14 may be provided on the outer circumference thereof the sheath 15 open at a predetermined portion thereof (the opening is the light-emitting portion 12A) as shown in FIG. 7(A).

The first and second embodiments of the present invention, having been described and illustrated in the foregoing, are used with a fountain and swimming pool, respectively. A light transmission hose of a type in which the light is emitted from the free end thereof or of a type in which the light is emitted from the lateral side thereof can be used singularly or in combination in an aquarium, bath, sea, river, lake, pond or the like. Further, the light transmission hose may be provided with a lens at the light-emitting portion thereof for convergence or divergence of the light guided through the hose. The shape of the light transmission hose is not limited to a pipe-like-one, but the hose may be formed into a long plate, cone. truncated cone or into any other shape which would suit an intended purpose.

(Third Embodiment)

The third embodiment is also used with a swimming pool. The aforementioned second embodiment uses an ordinary light source 11, while this third embodiment uses an lamp which emits ultraviolet rays having an effect of disinfection or sterilization. For safety of the swimmers in the pool, an on-off switch may be provided to turn on and off the ultraviolet lamp as necessary.

Figure 7B:
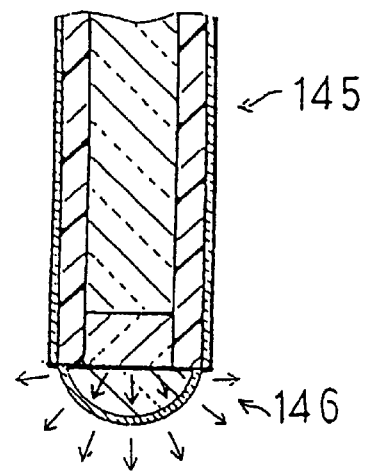
FIG. 7(B) is a sectional view of the light-emitting portion used in the variant shown in FIG. 7(A)
Figure 7C:
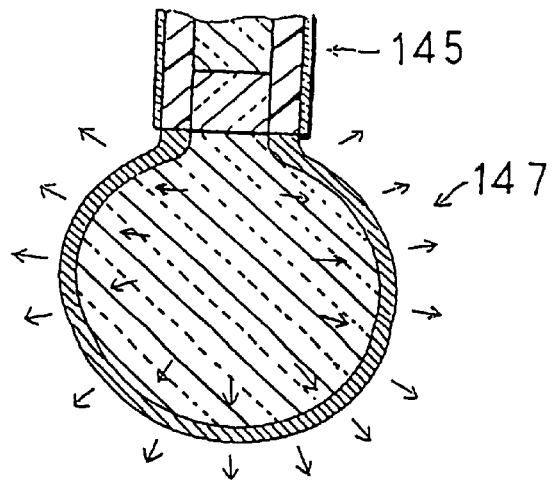
FIG. 7(C) is a sectional view of a variant of the light-emitting portion in FIG. 7(B)

As shown in FIG. 7(B), the light transmission hose 145 may have fixed at the free end thereof a light-emitting portion 146 made of a ground glass in the form of a hemisphere. The light-emitting portion may be any other one, for example, a nearly spheric structure 147 made of a ground glass as shown in FIG. 7(C). These light-emitting portions 146 and 147 are charged with a same material as that of the core 13. Also the material in these light-emitting portions 146 and 147 may have light-reflective and -scattering pieces mixed therein or the light-emitting portions 146 and 147 may be formed to have irregularities on the inner face thereof to scatter the light.

For effective disinfection or sterilization of the water on the swimming pool or water purifying plant, the waterproof lighting apparatus according to the present invention, provided always with a flat light emission tube, may always be installed therein.

(Fourth Embodiment)

FIG. 8 shows the fourth embodiment of the waterproof lighting apparatus according to the present invention, applied to an aquafarm. This waterproof lighting apparatus comprises a light source 40, a light transmission hose 41, light-scattering tubes 42 assembled together into a fish cultivation fence and a light filter 43 connected between the light source 40 and light transmission hose 41. The reference numerals 44, 44A and 45 denote floating member, cover, weight respectively.

In this embodiment, the light source 40 is so designed as to utilize the natural light during a fine weather and to energize a lamp with a power from a battery (not shown) in which a power from a solar battery is stored in a cloudy or rainy weather. More particularly, the light source 40 collects the sunlight effectively and efficiently by a parabolic reflector in a fine weather and the light thus collected is delivered through the light transmission hose 41 to the light filter 43.

Note that the light emitted from the light source 40 in this embodiment should contain a light of a wavelength same a color here in after ($\lambda 0$) fishes dislike most. Because of such a light wavelength (λ0), the fishes cutivated inside the cultivation fence will neither go near the light-scattering tubes 42 nor go out of the fence through between the light-scattering tubes 42.

Also, it is possible according to the present invention to grow many planktons, the fishes released inside the fence defined by the light-scattering tubes 42 and the like. To this end, the light emitted from the light source 40 should include rays of light of which the wavelength is suitable for proliferation of the planktons. Also a filter through which the light of that wavelength can be passed may be additionally provided to the light source 40.

(Fifth Embodiment)

FIG. 9 shows the fifth embodiment of the waterproof lighting apparatus according to the present invention, used as lighting on a fishing boat. This lighting apparatus comprises a light source 55, light transmission hose 56 and a light-emitting portion 57.

In this embodiment, the light-emitting portion 57 is used as installed on support columns on board on the fishing boat. However, the light-emitting portion 57 may be installed in any other suitable way. For example, the light-emitting portion 57 of a great length may be supported as stitched to a guard net 58.

(Sixth Embodiment)

Next, the sixth embodiment of the waterproof lighting apparatus according to the present invention will be described below.

Figure 10:
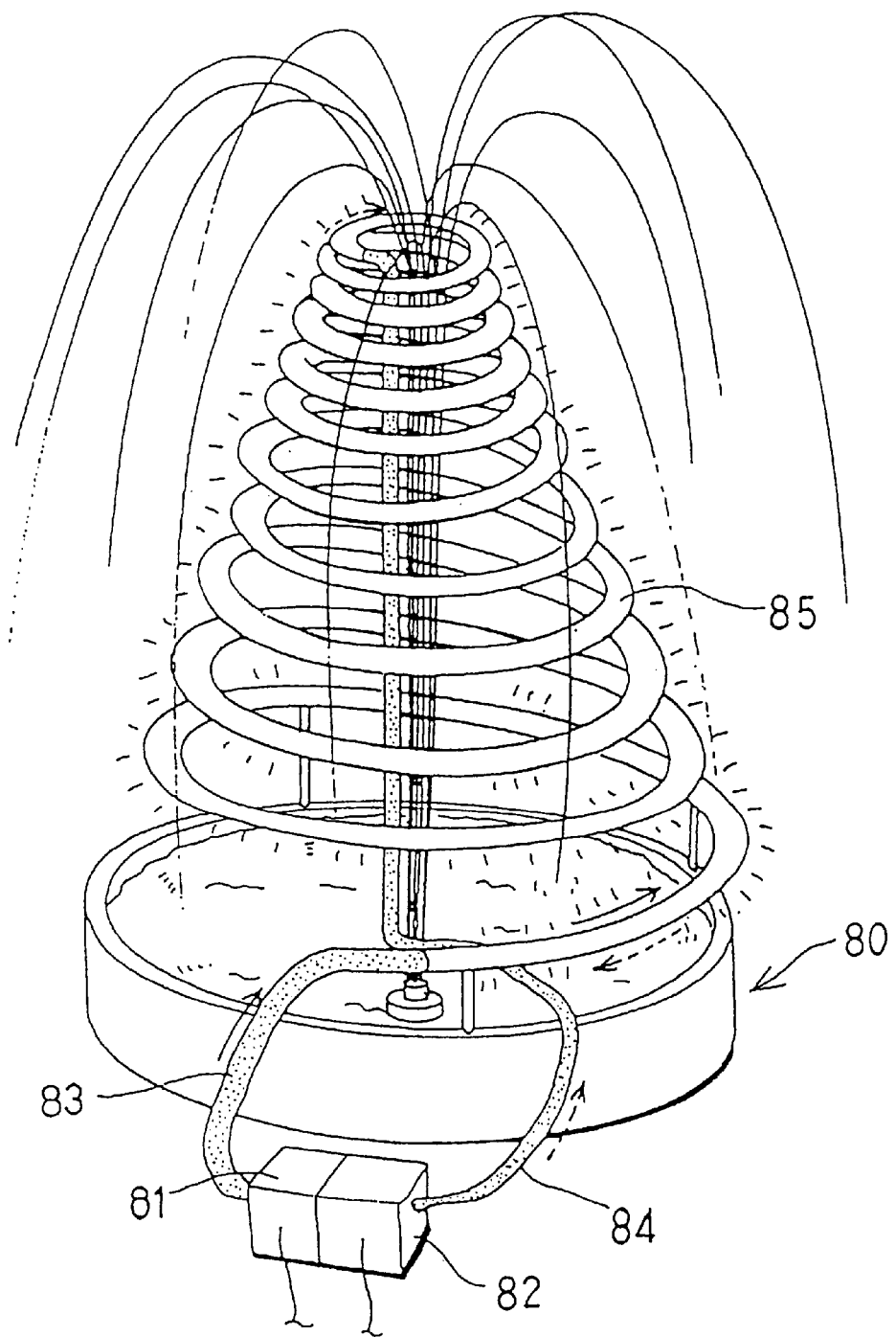
FIG. 10 is a perspective view of a sixth embodiment of the present invention.

FIG. 10 shows the six embodiment used with a fountain equipment 80. This fountain equipment 80 comprises a first and second light sources 81 and 82, light transmission hoses 83 and 84 and a light-emitting portion 85. This equipment is so designed that the light emitted from the light-emitting portion 85 varies in intensity along with the water jet correspondingly to a music played around the fountain equipment 80.

Figure 11:
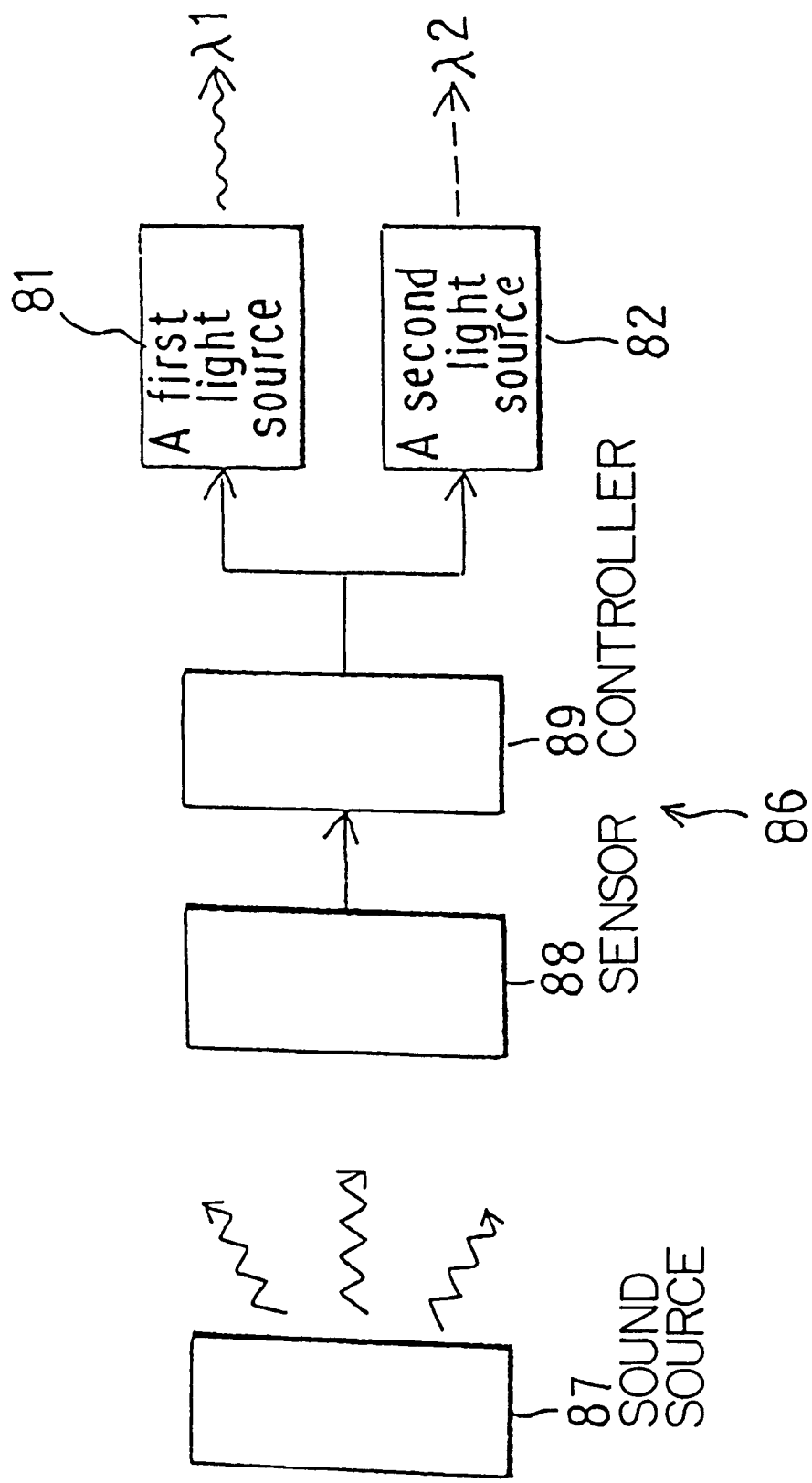
FIG. 11 is a block diagram of the sixth embodiment.

The first light source 81 is adapted to emit a normal light of a predetermined wavelength (λ1) within the domain of visible light, such as blue light. The second light source 82 is so designed as to intermittently emit a light of another predetermined wavelength (λ2), such as red light. These first and second light sources 81 and 82 are connected to a light modulator 86 shown in FIG. 11 showing a block diagram of the fountain apparatus 80. The light modulator 86 changes the light intensity correspondingly to the volume of the sound generated from a sound source 87 (for example, speaker or voice of viewers of the fountain). More particularly, the light modulator 86 comprises a sensor (microphone) 88 which detects a sound from the sound source 87 and delivers a detection signal output, and a controller 89 which receives the detection signal from the sensor 88 and delivers a predetermined control signal to the first and second light sources 81 and 82 to control the light intensity. Note that an electronic musical instrument may be connected, in place of the sensor 88, directly to the controller 89. The light-emitting portion 85 has a fixed shape, namely, a spiral shape which is increasingly opened downward in this embodiment.

Figure 12:
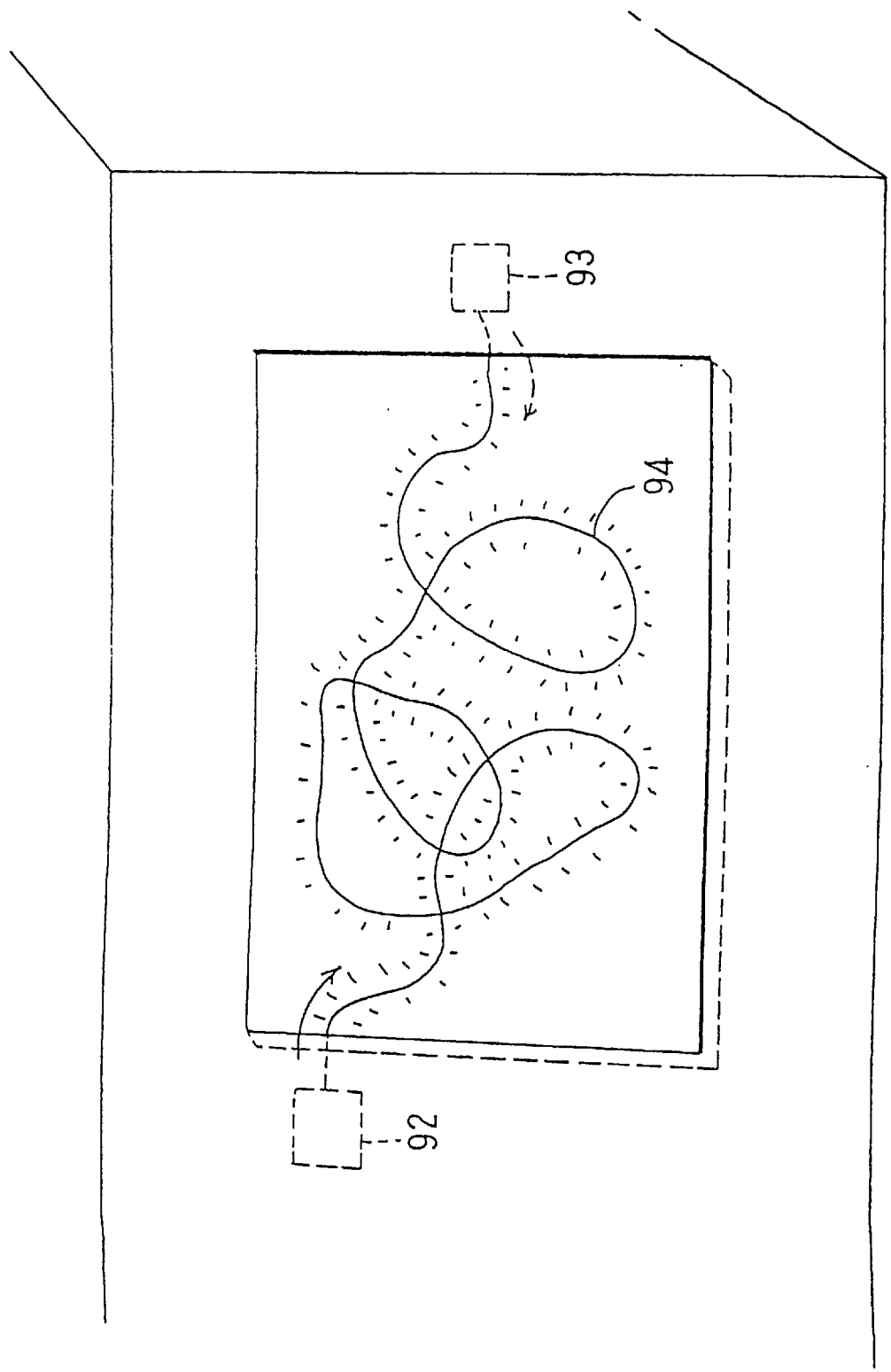
FIG. 12 is a plan view of another variant of the present invention.

The apparatus according to the present invention is not limited to the type which provides an illumination around it as in this sixth embodiment, but a shown in FIG. 12, for example, a light-emitting portion 94 may be disposed flat on a part of, for example, the outer surface of a building wall and connected at opposite ends thereof to light sources 92 and 93, repectively, disposed as buried in the building wall and which operate in different manners, thereby providing a planar illumination on the building wall.

In this example, the lights from the light sources are made to travel in opposite directions but the present invention is not limited to this arrangement. The lights maybe emitted in a same direction from light sources placed at a same side with one of the lights emitted as delayed in time from the other.

The sixth embodiment of the present invention may be used as a sound-lighting system which can be used for a night show using water, sound and light in combination at an open-air concert hall.

(Seventh Embodiment)

Figure 13:
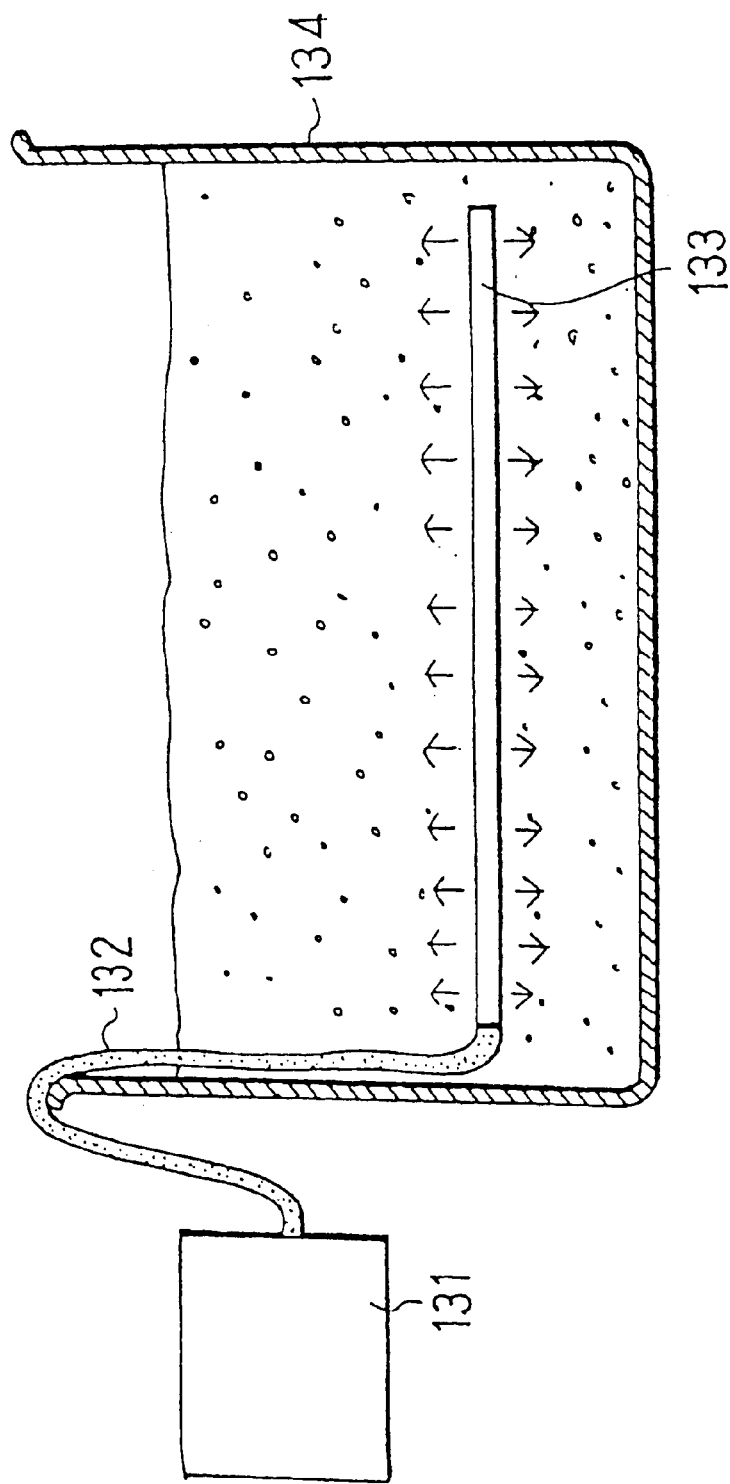
FIG. 13 is a schematic drawing of a seventh embodiment of the present invention.

FIG. 13 shows the seventh embodiment of the present invention, adapted for biological use to give a light to living things which are not lighted at all or give a supplementary light to such things which are exposed to the sunlight or to any other lighting. The lighting apparatus according to this embodiment comprises a light source 131 which generates suitable light for rearing living things, light transmission hose 132 and a light-emitting portion 133. This apparatus is used for cultivation of chlorella or the like in a bath 134.

(Eighth Embodiment)

Figure 14:
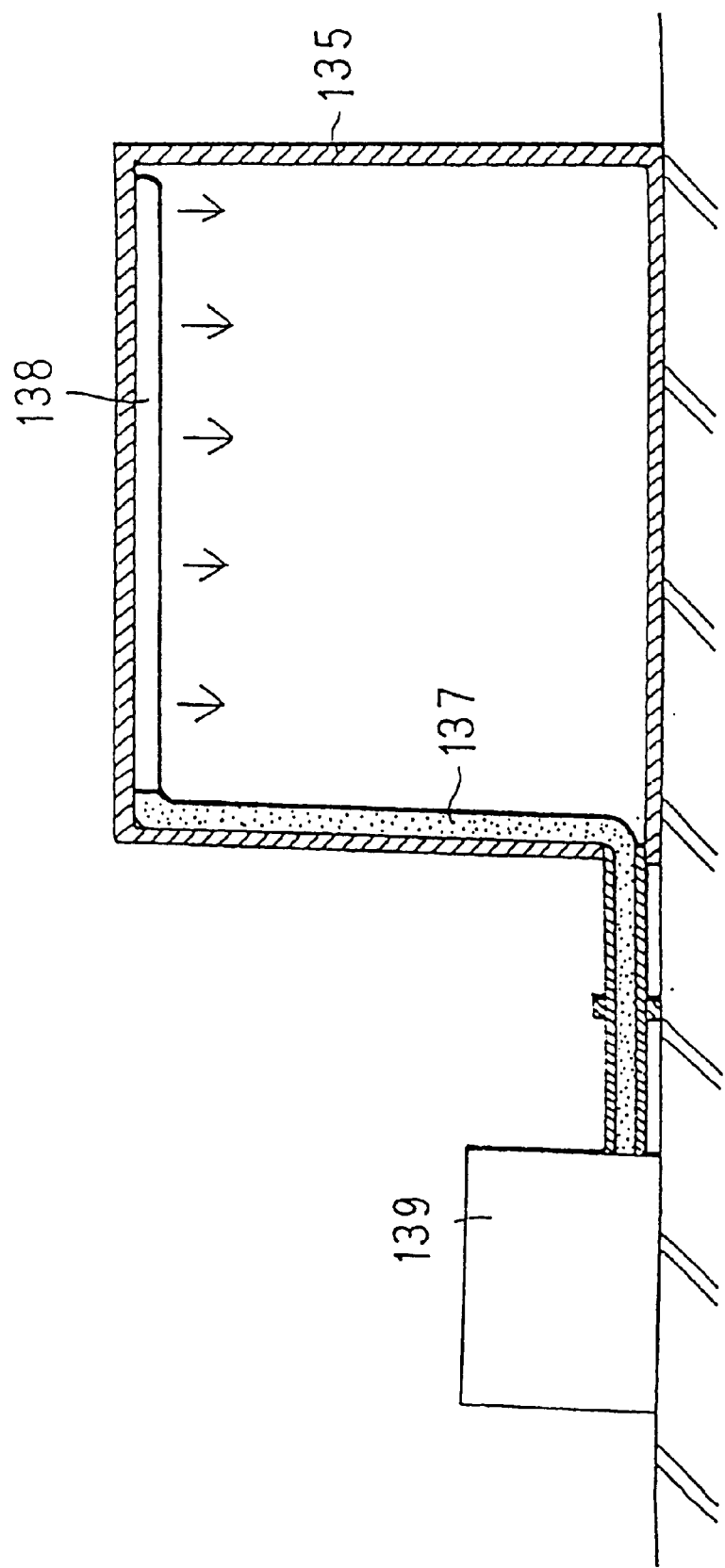
FIG. 14 is a schematic drawing of an eighth embodiment of the safe lighting apparatus according to the present invention.

FIG. 14 shows the eighth embodiment of the present invention, used in a powder magazine in a fireworks factory (or in a high-humidity warehouse or low-temperature warehouse). The reference numeral 135 in Figure denotes the powder magazine. This embodiment of the safe lighting apparatus according to the present invention comprises a light source 139, light transmission hose 137 and a light-emitting portion 138.

In this embodiment, only the light is led into the powder magazine 135 through the light transmission hose 137 and no heat or electrocity will possibly be led into the magazine 135. Therefore, even if the magazine 135 become full of any combustible gas, the lighting apparatus according to the present invention assures a highly safe illumination with no possibility of any explosion or induced explosion in the magazine 135.

(Ninth Embodiment)

Figure 15:
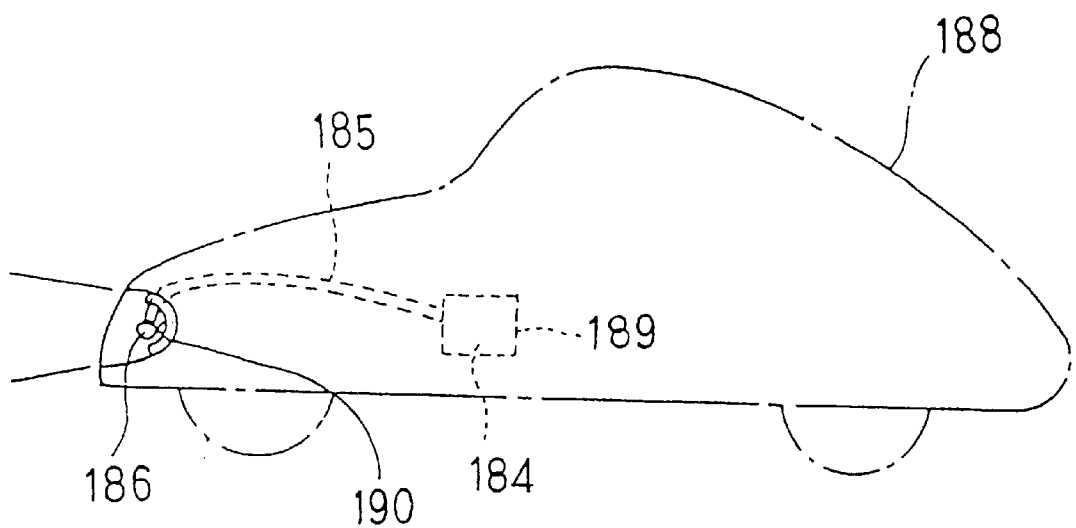
FIG. 15 is a schematic drawing of a ninth embodiment of the present invention.

Next, the ninth embodiment of the lighting waterproof apparatus according to the present invention will be discussed herebelow with reference to FIGS. 15 and 16. As shown in FIG. 15, this apparatus comprises a light source 184, light transmission hose 185 and a spot-lighting portion 186, and it serves as a headlight of a car generally indicated with 188. The reference numeral 190 denotes a generally concave reflection mirror which is to project nearly horizontally the light emitted from the spot-lighting portion 186.

In this embodiment, the light source 184 emits a light of such a wavelength as provides a lighting by which the car driver can have a good vision before him. The light source 184 is placed in a compact lamp house 189. The light source 184 is so designed that when a lamp used as the light source has the filament burnt out, it is alarmed on the dashboard (not shown) and thus the lamp can be readily replaced. The light source 184 may be so designed that the light intensity is freely adjustable depending upon the required lighting brightness for car driving or upon the weather. Otherwise, the light source 184 may be composed of two or more lamp bulbs including a main lamp, fog lamp and the like so that the main lamp can be switched to the fog lamp, for example, as necessary.

The light transmission hose 185 is covered with an inflammable sheath and laid as passed from the car inside through the bonnet to the front of the car as shown.

Figure 16:
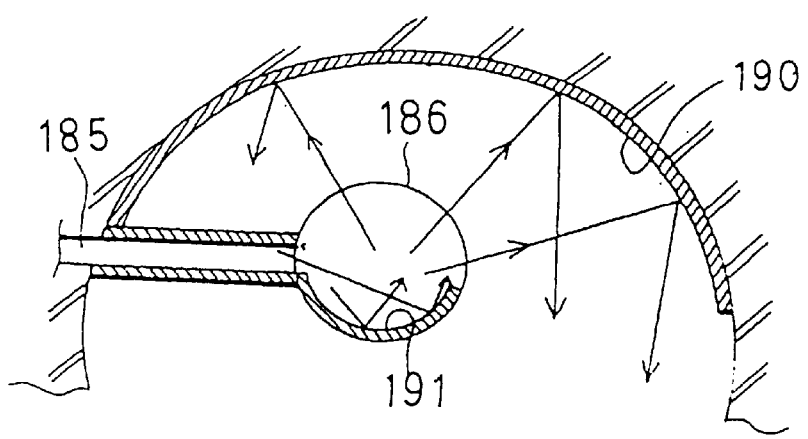
FIG. 16 is a sectional view of the light-emitting portion used in the ninth embodiment.

As shown in FIG. 16, the spot-lighting portion 186 consists of a transparent spheric structure having a reflective layer 191 applied on a circumference thereof opposite to the reflective mirror 190 to project the light toward the latter. Also, the spot-lighting portion 186 may be made of a light-scattering material in which a transparent material of which the index of refraction is different from that of the (a) transparent matrix is diffused in the matrix to form an optically nonuniform structure. Further, the light-scattering material may be formed into a rod which serves as a light emission tube or into a flat or any other suitable shape. The spot-lighting portion may have a spheric structure made of such a light-scattering material.

Also, since the light from a single light source can be branched to illuminate a plurality of places, the present invention is usable with a high economy.

(Tenth Embodiment)

Figure 17:
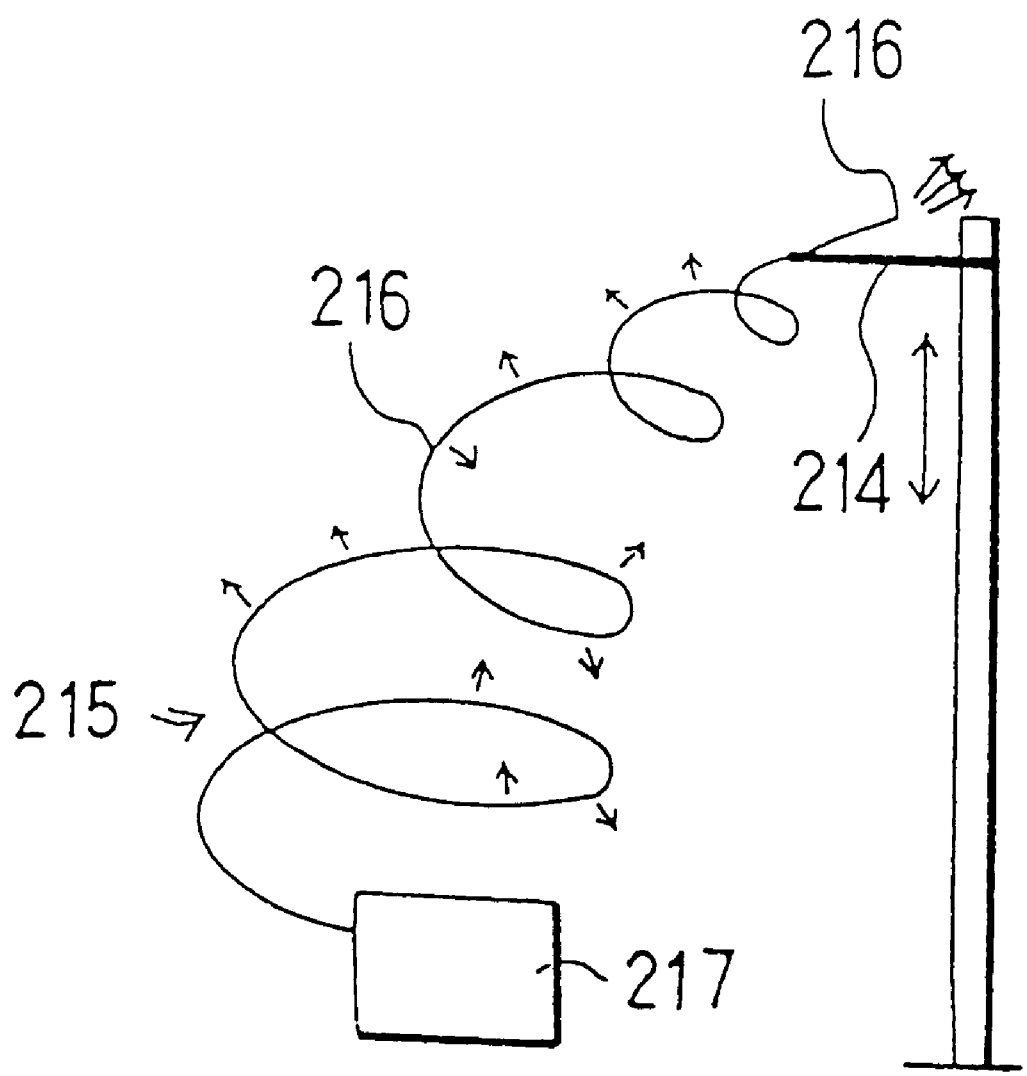
FIG. 17 is a side elevation of a tenth embodiment of the present invention, showing the light transmission hose formed as a moving decoration.

The tenth embodiment of the waterproof lighting apparatus shown in FIG. 17 is used as a decoration placed outdoors. This embodiment comprises a vertically moving member 214, a flexible light transmission hose 215 fixed at the free end thereof to the top of the moving member 214, light-emitting portions 216 formed at the free end as well as along the lateral side of the hose 215, and a light source 217. The light-emitting portion 216 at the free end of the hose 215 may be omitted and the entire lateral side of the hose 215 or a portion thereof may be used as light-emitting portion.

In this tenth embodiment, the flexible light transmission hose 215 can follow up with the movement of the member 214 to correctly illuminate a place to be lighted. This embodiment can be used safely and without any inconvenience even in rain.

(Eleventh Embodiment)

Figure 18:
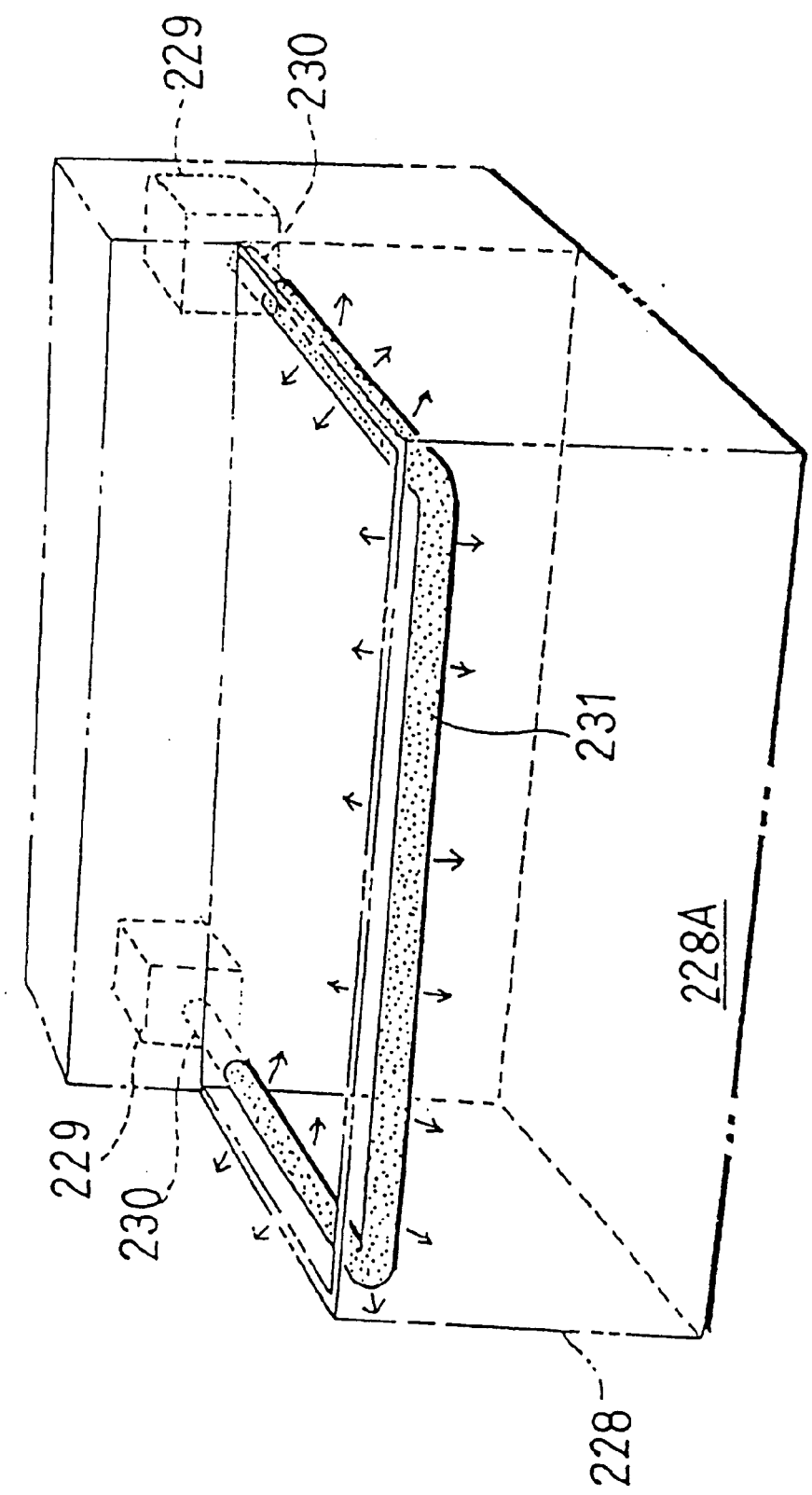
FIG. 18 is a perspective view of an eleventh embodiment of the waterproof lighting apparatus according to the presenr invention.

The eleventh embodiment of the present invention will be discussed below with reference to FIG. 18 showing the application of the waterproof lighting apparatus in a transparent refrigerator or cooling box in which the humidity is very high, generally indicated with 228. The lighting apparatus according to this embodiment comprises a pair of light sources 229, light transmission hose 230 and a light emission tube 231.

The light source 229 used in this embodiment emits a light of such a color (wavelength) as effectively illuminates things in the transparent refrigerator 228, and it is located separately from a to-be-illuminated freezer 228A in the refrigerator 228.

B. Lighting Apparatuses for Marking or Information (Twelfth Embodiment)

Figure 19:
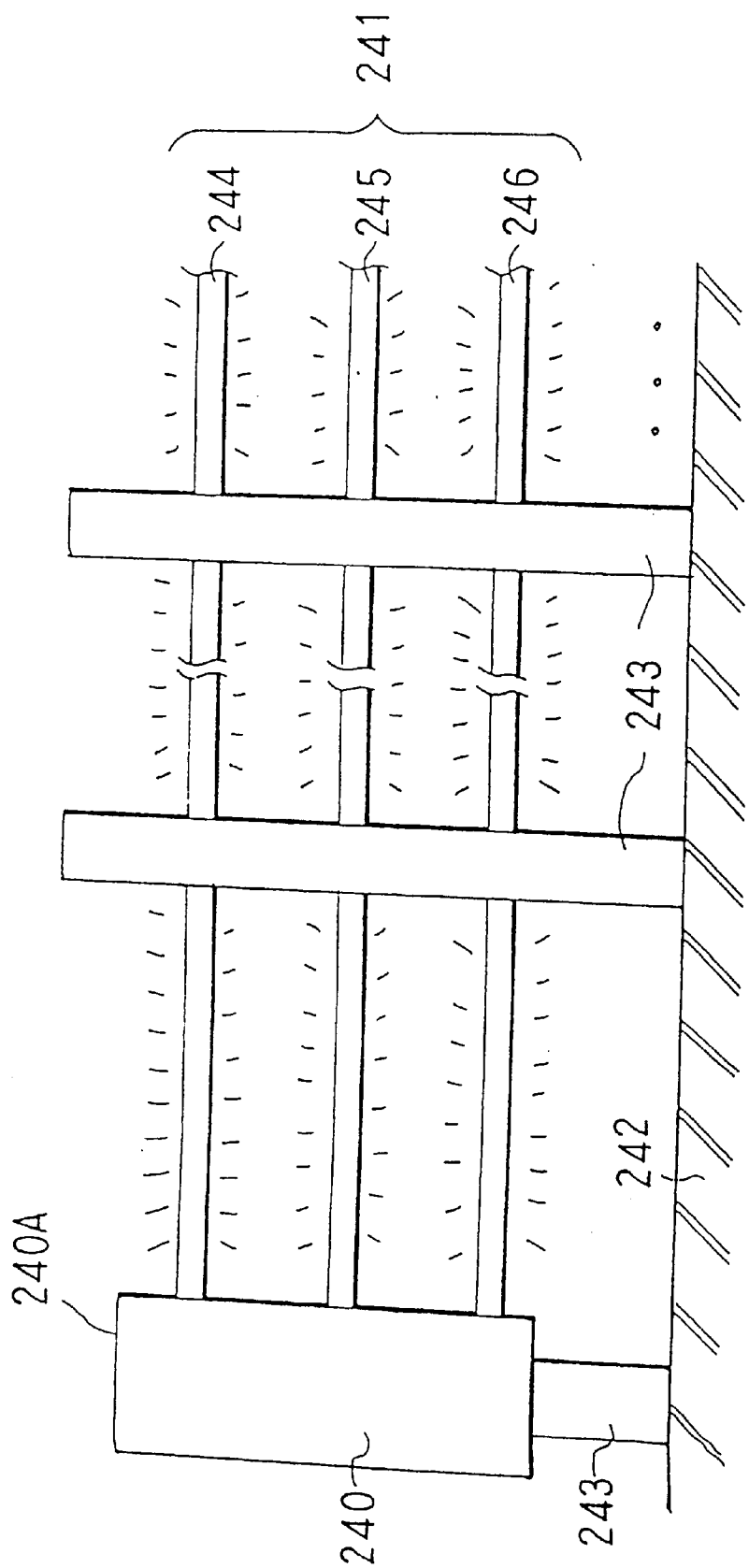
FIG. 19 is a schematic diagram of a twelfth embodiment of the waterproof lighting apparatus according to the present invention.

FIG. 19 shows the twelfth embodiment of the waterproof lighting apparatus according to the present invention, applied as an optical guard rail. The embodiment comprises a light source 240, light transmission hose (not shown) and light emission tubes 241. This guard rail is intended to inform car drivers of the lateral extremity of a road or lane at night, thereby preventing the car driver from going beyond the lateral extremity of the road.

The light source 240 used in this embodiment emits a light of such an optimum wavelength that the car driver can easily know the existence of the guard rail. The light source 240 is located in a lamp house 240A fixed on a selected one of standing support columns 243 set in the road 242.

Figure 20:
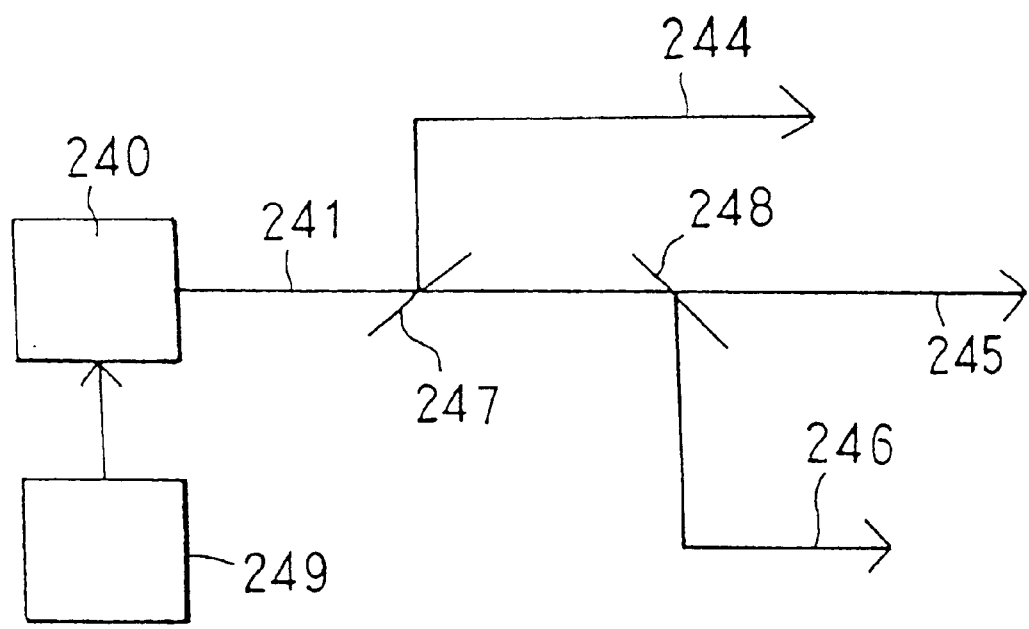
FIG. 20 is a schematic diagram showing the branched light paths in the twelfth embodiment.

The light emission tubes 241 in the embodiment include those 244 to 246 fixed on the support columns 243. As shown in FIG. 20, two half-mirrors 247 and 248 are provided at the branch points of the light emission tubes 241 to distribute the light from the light source 240 to the light emission tubes 244 to 246, respectively.

The light source 240 is provided with a controller 249 which controls the light source 240 to provide intermittent lighting at night or in rain.

Figure 21:
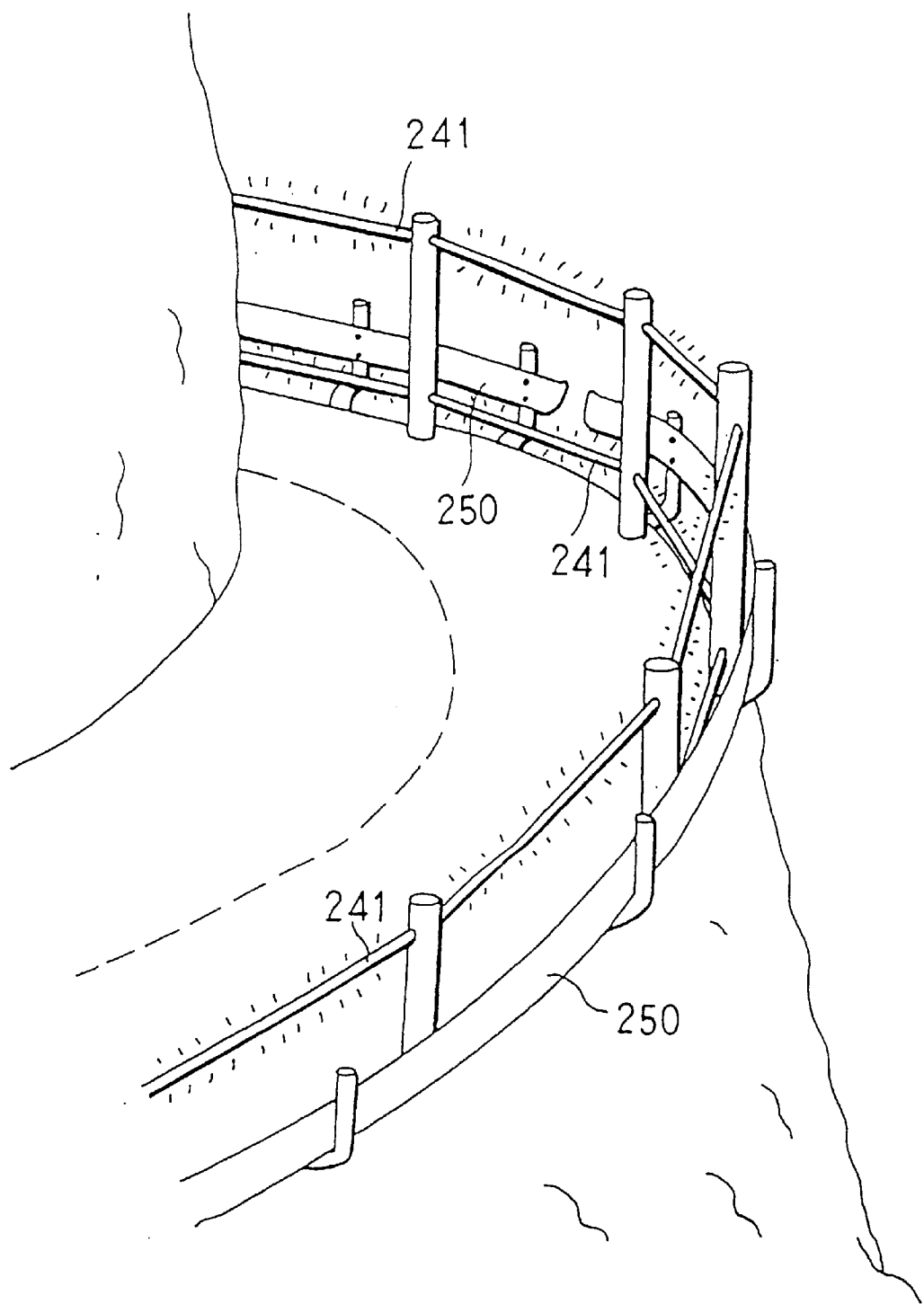
FIG. 21 is a perspective view of the twelfth embodiment, showing one application thereof.

The lighting apparatus according to the present invention may be used as installed inside a guard rail 250 along a road curve profiled by a steep cliff as shown in FIG. 21. A car about to go beyond the road will first collide with the light emission tubes 241 of the lighting apparatus. The elasticity of the tubes 241 permits to attenuate the collision of the car to some extent.

Figure 22:
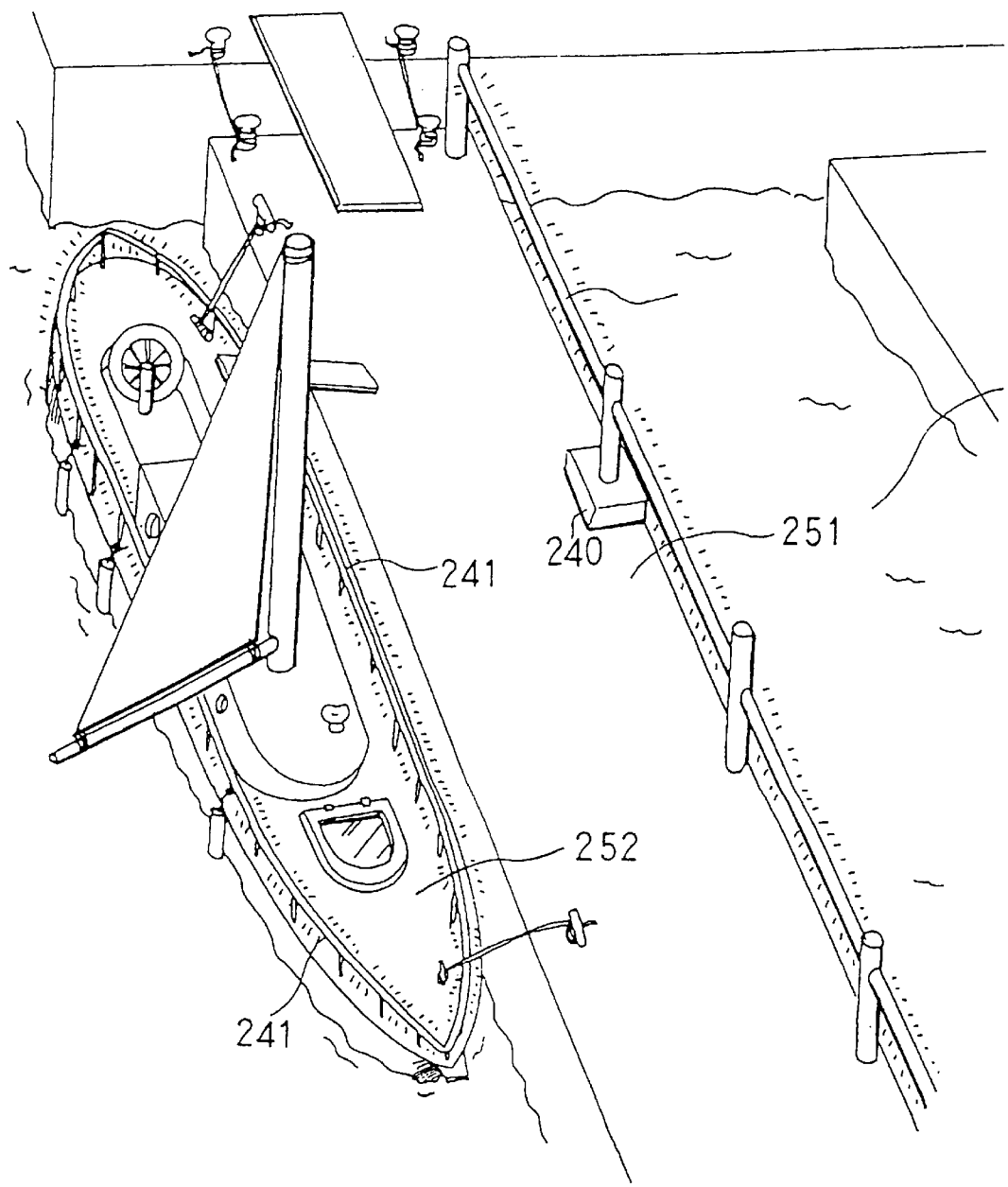
FIG. 22 is a perspective view of the twelfth embodiment, showing another application thereof.

Further, the waterproof lighting apparatus according to the present invention may be used as installed on a pontoon 251 in a marina, for example, as shown in FIG. 22. It serves as a fence to prevent a person from falling into the sea especially at night. Also, the lighting apparatus may be used on board on a yacht 252 as also shown in FIG. 22. In this case, the light source can be supplied with a power from a battery (not shown) equipped in the yacht. The light emission tube 241 is used as the life line of the yacht to prevent a person from falling into the sea at night. Also a solar battery may be installed on the deck of the yacht to store a power into the main battery in the daytime, thereby compensating the power consumption of the light source at night.

Furthermore, the lighting apparatus according to the present invention may be used in a skiing ground to give a warning of a hazard or a hazardous area at night or in a bad weather by enclosing the latter with the light emission tube. Also, the lighting apparatus according to the present invention may be used in an airport. In this case, the boundaries of runways may be indicated at night or in a bad weather by enclosing the runways with the light emission tubes of the present invention.

Therefore, in the twelfth embodiment, the light of a predetermined wavelength from the light source 240 is led to the linear light emission tube 241. The light continuously or intermittently emitted from the light emission tube 241 permits to inform people or vehicle driver of a hazard or a hazardous area enclosed with the light emission tube 241. Even if a person or vehicle colliders with the light emission tube 241, the tube 241 itself will be bent or extended to attenuate the collision. Thus, the waterproof lighting apparatus according to the present invention will be much contributed to the safety in the transportation and traffic.

(Thirteenth Embodiment)

Figure 23:
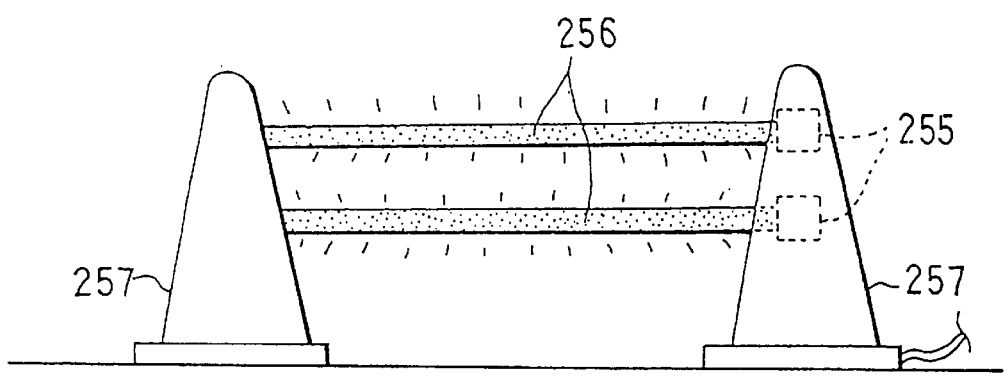
FIG. 23 is a front view of a thirteenth embodiment of the waterproof lighting apparatus according to the present invention.

FIG. 23 shows the thirteenth embodiment of the waterproof lighting apparatus according to the present convention, applied on signaling fences used in road construction. The lighting apparatus according to this embodiment comprises light sources 255, light transmission hose (not shown) and light-emitting portions 256 supported on conical supports 257.

The light source 255 is provided in the support 257 and uses a xenon flash lamp which emits a bright light intermittently for easy awareness of the fence on the road from a position far away therefrom.

(Fourteenth Embodiment)

Figure 24:
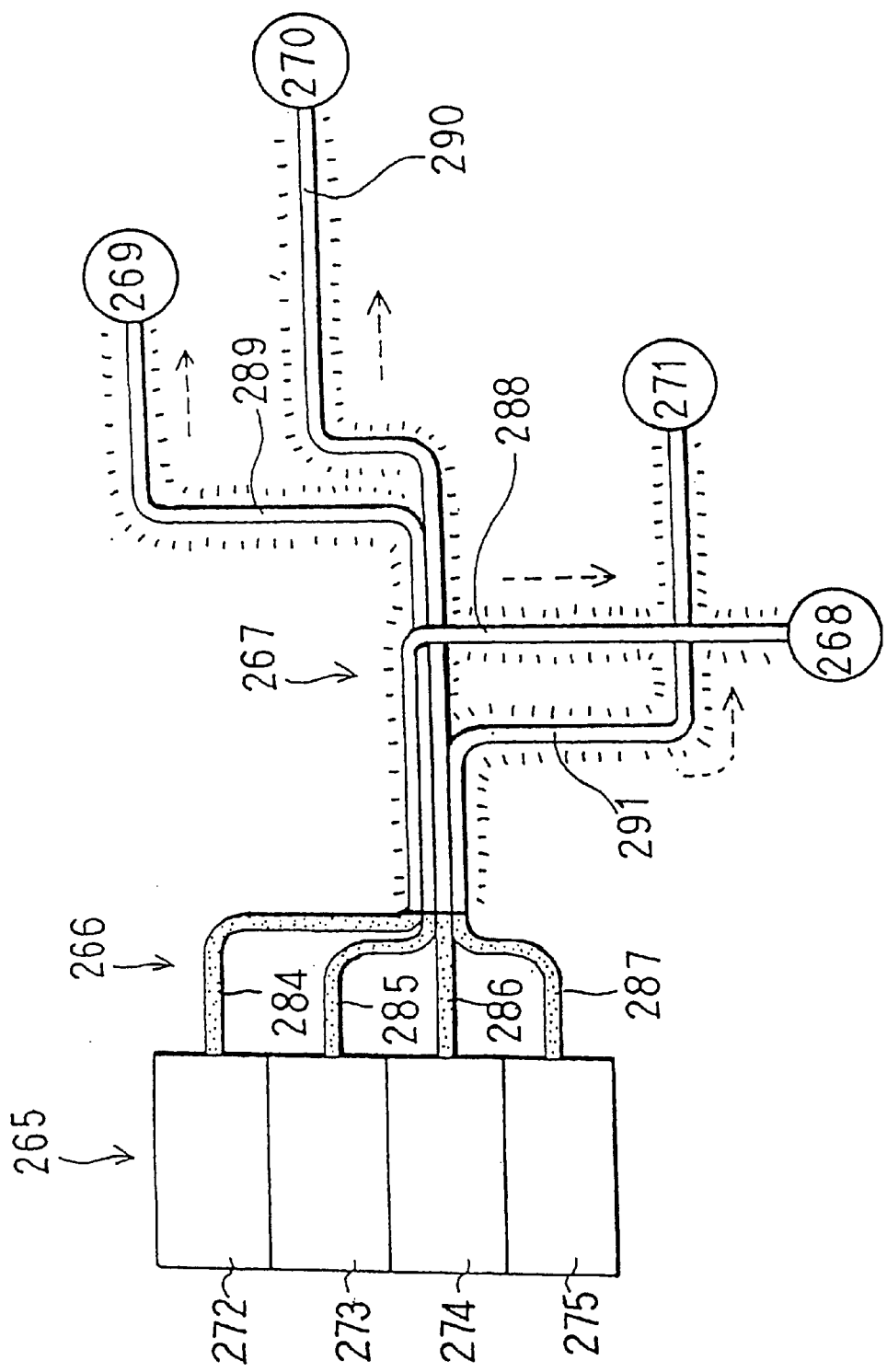
FIG. 24 is a schematic diagram of a fourteenth embodiment of the waterproof lighting apparatus according to the present invention, showing the application thereof as an information board at a subway station.

FIG. 24 shows the fourteenth embodiment of the waterproof lighting apparatus according to the present invention, used as a track information at a subway station. This embodiment uses as many light sources (generally indicated with 256), light transmission hoses (generally indicated with 266) and light emission tubes (generally indicated with 267) as the tracks 268 to 271.

The light source 256 comprises a first to fourth light sources 272 to 275, each emitting a light of a color (wavelength λ) easily discernible by the passengers in the station. The subway station in this example has the four tracks and the light sources 272 to 275 emit lights of different colors (wavelength λA, λB, λC and λD) for the respective tracks 268 to 271 into the light transmission hoses 284 to 287, respectively.

The first to fourth light sources 272 to 275 may be designed to emit lights of different colors (wavelengths) or may be provided with color filters respectively, which pass only the lights of the predetermined colors (wavelengths including at least λA to λD) from the light sources 272 to 275.

The light emission tubes 267 include the four ones 288 to 291 for the respective tracks 268 to 271, provided on the commutation passage floor, wall surface or ceiling of the station building and adapted to emit, as linear continuous or intermittent lighting, the lights transmitted from the light sources 265 through the light transmission hoses 266. The light emission tubes may be the light transmission hoses 266 not covered with any light-shielding sheath.

Figure 25:
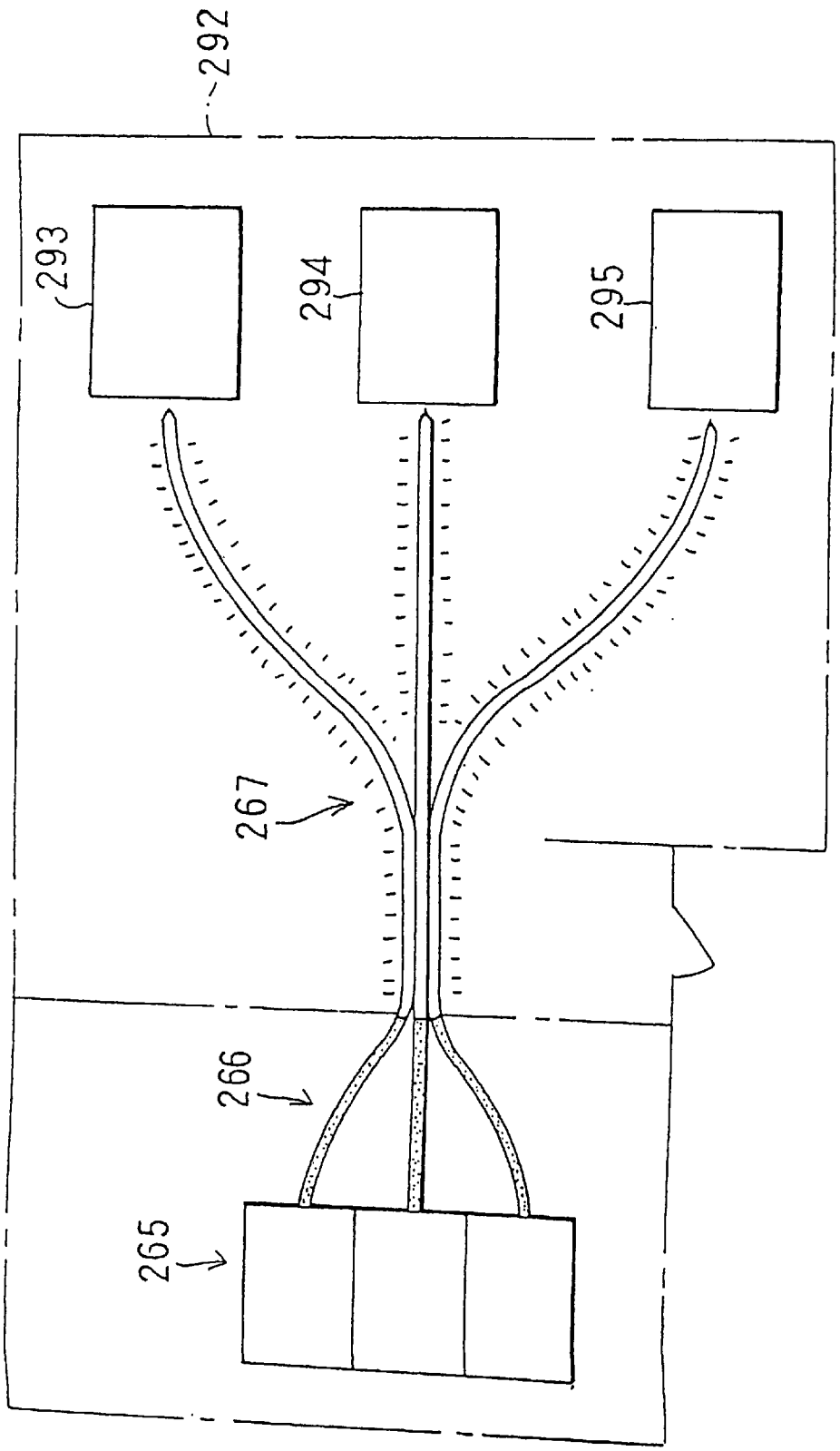
FIG. 25 is a schematic diagram of an variant of the fourteenth embodiment, showing the application thereof as an information board at a hospital.
Figure 26:
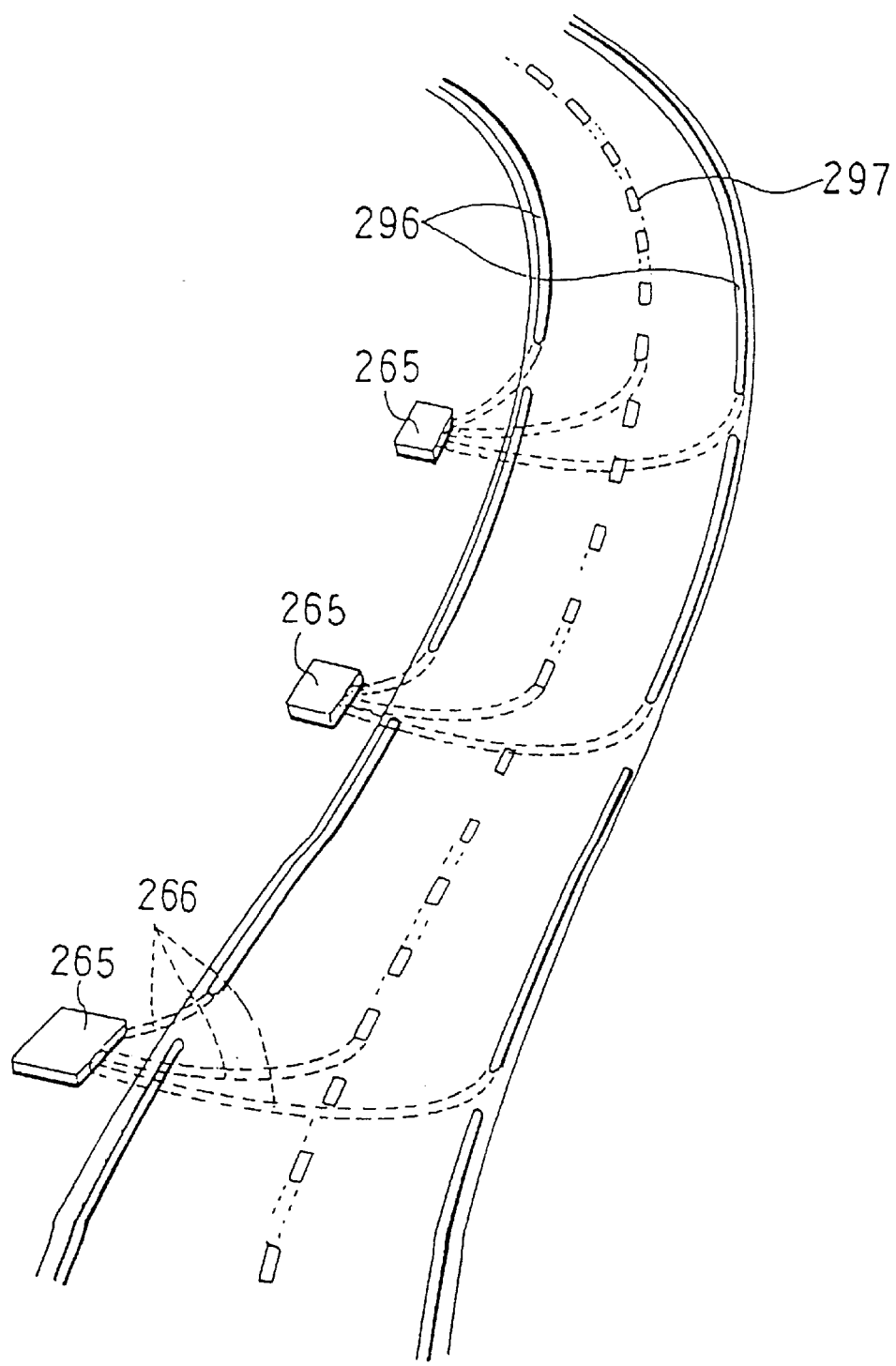
FIG. 26 is a schematic drawing of another variant of the fourteenth embodiment, showing the application thereof to traffic markers.
Figure 27:
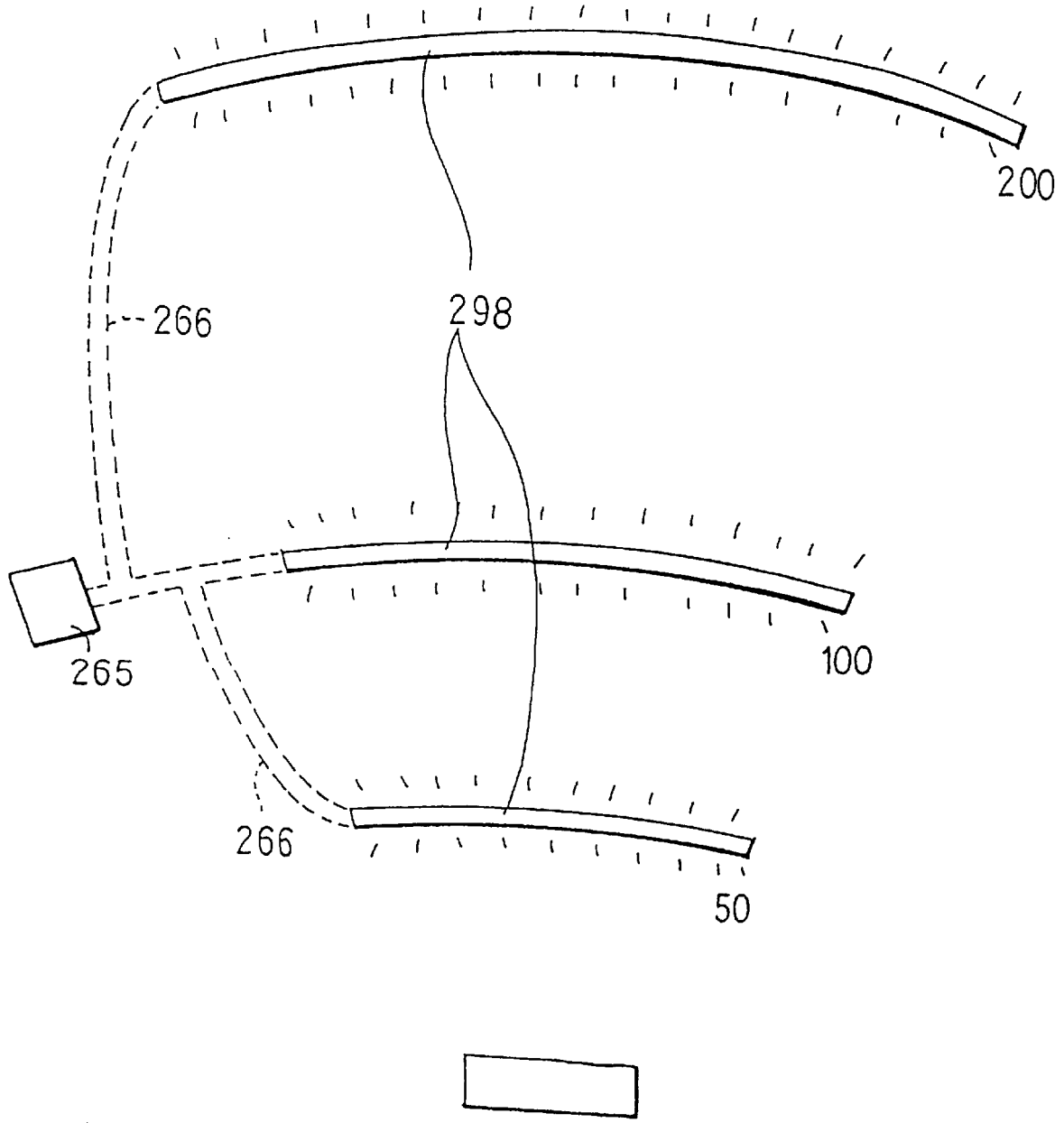
FIG. 27 is a schematic drawing of still another variant of the fourteenth embodiment, showing the application thereof to yardage markers used in a golf practice range.

This embodiment uses the lighting apparatus as the track information board at a subway station, but the present invention is not limited only to this application. For example, the lighting apparatus acccording to the present invention may be used as an informative marking for guiding patients to a surgery department 293, internal department 294, dental department 295, etc., respectively, in a hospital or clinic building 292 as shown in FIG. 25. Also, light emission tubes 296 and 297 according to,the present invention may be laid near a sharp curve of a road to indicate the center line and edge thereof as shown in FIG. 26, and a light emission tube 298 according to the present invention may be used as yardage markers in a golf practice range as shown in FIG. 27.

Further, the waterproof lighting apparatus according to the present invention maybe used as guidance or informative markings in various fields, such as markers of marine structures such a smarine hose, pontoon, sea mark, etc., emergency guide line in a building, foot-light in a theater, guides along escalator, stairway, etc., track markers in a track and field stadium, cource lines in a swimming pool, coat lines in a skating link, taxi lane markers in an airport, etc.

According to the fourteenth embodiment, the linear light emission tubes 267 illuminate continuously or intermittently in their respective colors to permit easy and quick confirmation of a desired area or destination. Namely, the lighting apparatus according to the present invention provides a highly discernible marking or indication, and so it is of a great help for assurance of the safety in overland, marine or air traffic as well as for guiding in public institutions such as stations, hospitals, etc.

(Fifteenth Embodiment)

Figure 28:
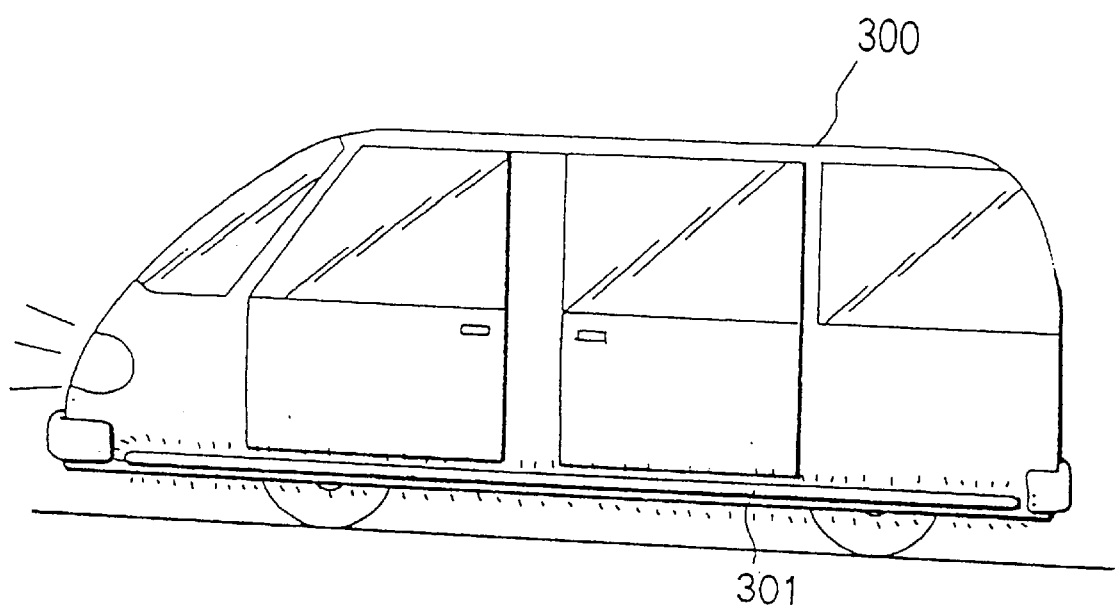
FIG. 28 is a side elevation of a fifteenth embodiment of the waterproof lighting apparatus, showing the installation thereof on a car.

FIG. 28 shows the fifteenth embodiment of the waterproof lighting apparatus according to the present invention, applied for providing a linear illumination of the lateral bottom of a car body 300. The apparatus comprises a light source (not shown), light transmission hose (not shown) and a light emission tube 301.

(Sixteenth Embodiment)

Figure 29:
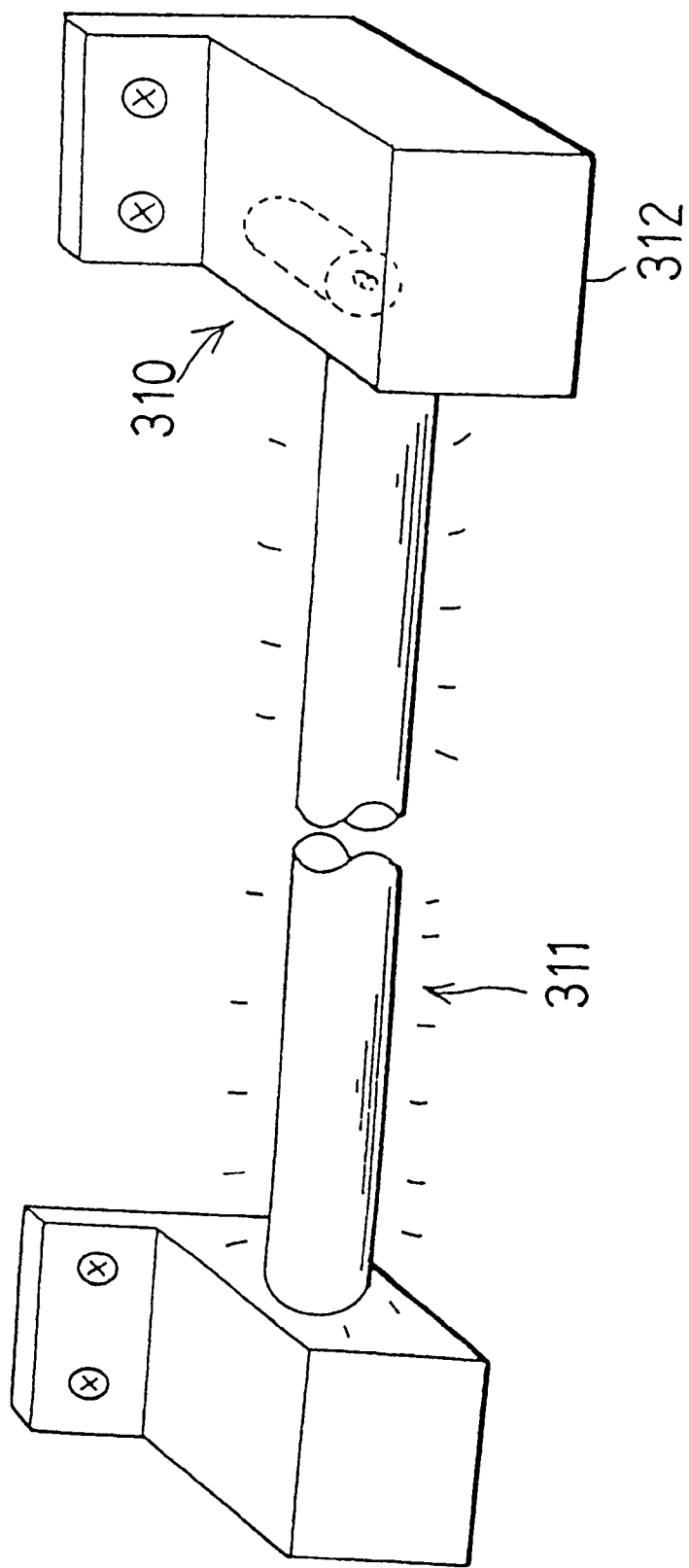
FIG. 29 is a perspective view of a sixteenth embodiment of the waterproof lighting apparatus according to the present invention.

FIG. 29 shows the sixteenth embodiment of the present invention, used as a hanger bar in a closet. The apparatus according to this embodiment comprises a light source 310, pole-like light emission tube 311 and a lamp house 312.

(Seventeenth Embodiment)

Figure 30:
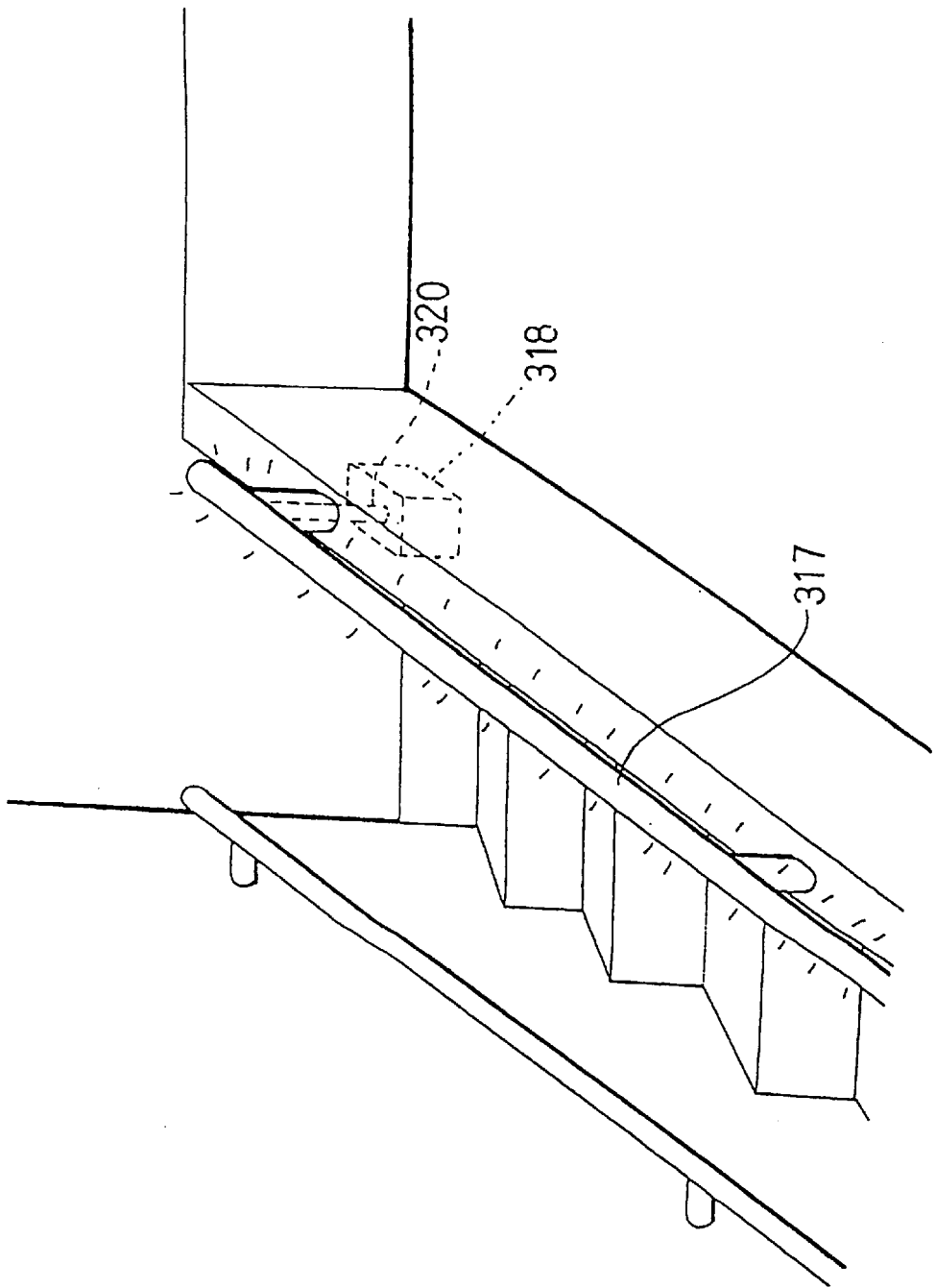
FIG. 30 is a perspective view of a seventeenth embodiment of the waterproof lighting apparatus according to the present invention.

FIG. 30 shows the seventeenth embodiment of the present invention, used as a handrail of an outdoor stairway. The lighting apparatus comprises a light source 318, light transmission hose 320 and a light emission tube 317 as a handrail.

C. Lighting Apparatus for Signaling, Advertising or Similar Purpose (Eighteenth Embodiment)

Figure 31:
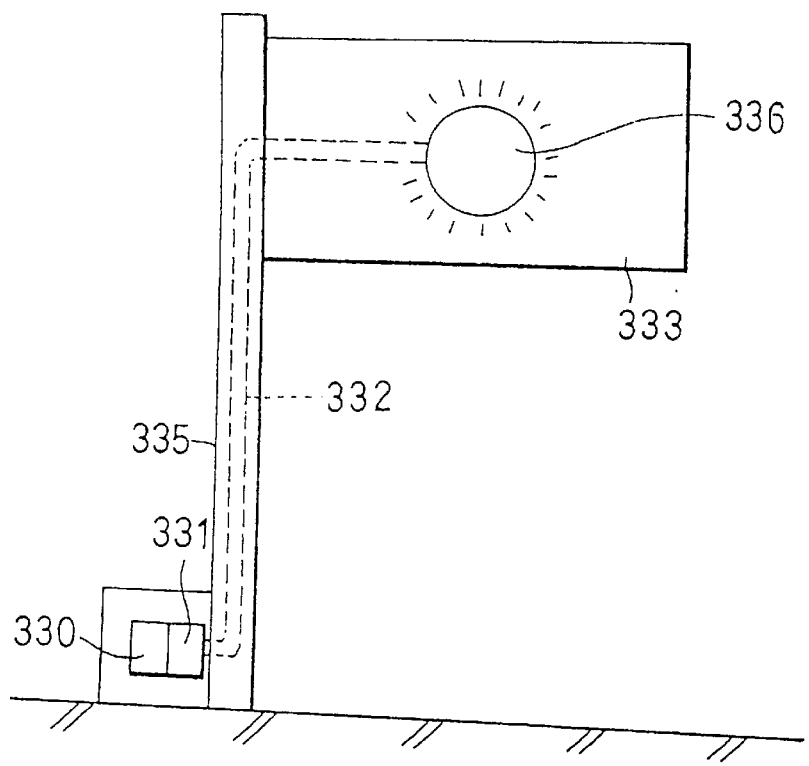
FIG. 31 is a schematic drawing of an eighteenth embodiment of the waterproof lighting apparatus of the present invention, showing the use thereof with a traffic signal.

FIG. 31 shows the eighteenth embodiment of the waterproof lighting apparatus according to the present invention, used as a traffic signal. The signal comprises a light source 330, color filter 331, light transmission hose 332, panel 333 in which a light-emitting portion 336 is built, and a color selecting means 334 (see FIG. 32).

The light source 330 is adapted to emit lights in a predetermined wavelength domain including wavelength λR, λY and λB (λR>λY>λB) for at least red, yellow and blue, for example, in the whole visible-light domain.

Figure 33:
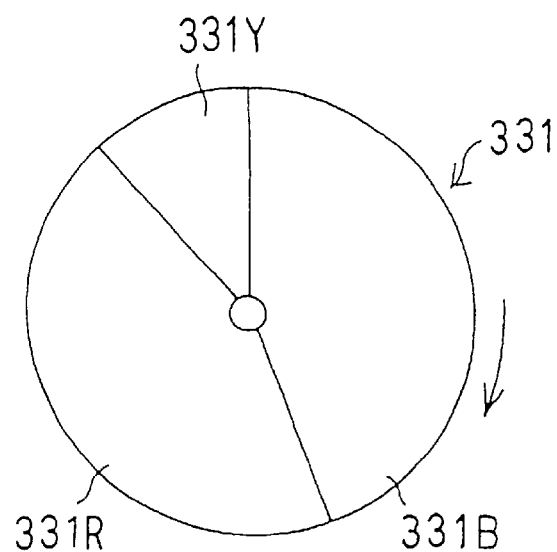
FIG. 33 is a plan view of the color filter used in the eighteenth embodiment.
Figure 34:
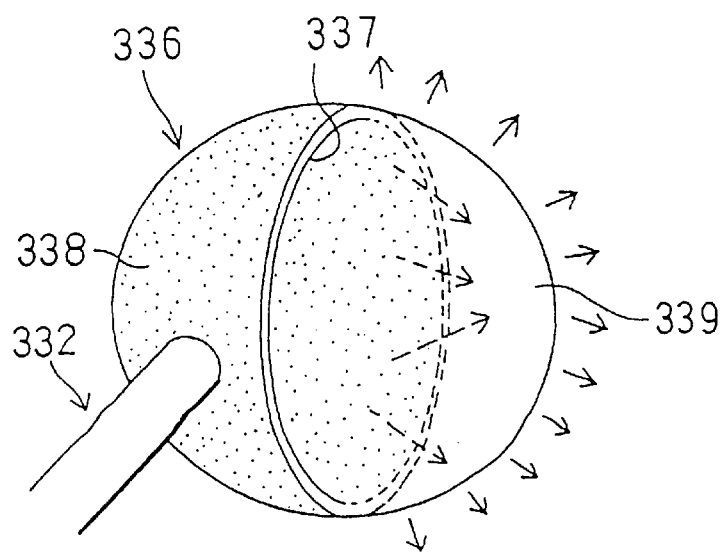
FIG. 34 is a perspective view of the indication portion used in the display panel in the eighteenth embodiment.

The color filter 331 selectively passes only the lights of wavelength λR, λY and λB for red, yellow and blue (or green, same herein after) among the lights from the lights source 330. In this embodiment, a disk-shaped color filter 331 is employed which is divided into a red filter 331R, blue filter 331B and yellow filter 331Y having areas corresponding to the on times of the red, blue and yellow colors, respectively, as shown in FIG. 33. The color filter 331 is disposed on a light path along while the light from the light source 330 travels, and it is rotated by a motor 341 which will be discussed later.

This embodiment uses the rotary disk-shaped color filter, but the color filter is not limited to this design. Since the signal according to the present invention is used for vehicles, the three colors, red, yellow and blue, are used, but the colors may be two, red and blue, in case the signal is used for walkers.

The light transmission hose 332 in this embodiment is disposed inside a support mast 335 to which the panel 333 is installed. It provides an optical connection from the color filter 331 to a light-emitting portion 336 in the panel 333 to deliver the light from the light source to the light-emitting portion 336.

The panel 333 fixed at the support mast 335 has the light-emitting portion 336 provided in the center thereof.

The light-emitting portion 336 consists of a generally hemispheric reflector 338 having a reflecting layer 337 such as silver formed on the inner circumference thereof and a generally hemispheric ground glass 339 joined to the opening edge of the reflector 338 and which diverges the light reflected from the reflector 337. The free end of the light transmission hose 332 is fixed at a predetermined angle to the reflector 338. In this embodiment, the light-emitting portion 336 is composed of the reflector 338 and ground glass 339, but the present invention is not limited only to this construction. For example, the light-emitting portion 336 may be a transparent light emission tube made of a core and clad similar to those in the light transmission hose 332, the clad having fine irregularities formed on the inner circumference thereof. Also the light-emitting portion 336 may be made of a light-scattering material having diffused in a transparent matrix thereof a transparent material of which the index of refraction is different from that of the matrix to have an optically nonuniform structure.

Figure 32:
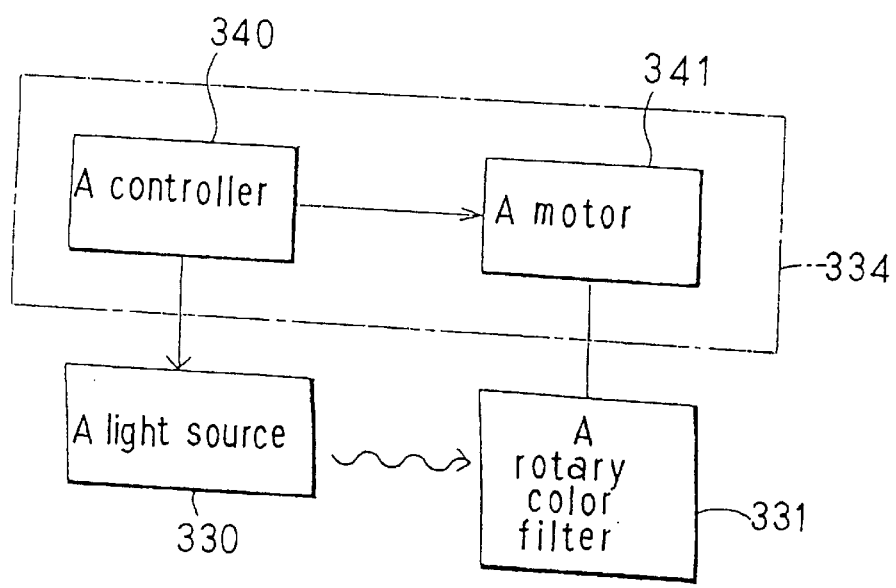
FIG. 32 is a schematic block diagram of the eighteenth embodiment, showing the electrical connection of the signal.

The color selecting means 334 controls the operation of the color filter 331 to repeatedly supply the lights of three predetermined wavelength for red, blue and yellow, respectively, to the light-emitting portion 336 in the panel 333 for the respective lengths of time. According to this embodiment, the color selecting means 334 comprises a controller 340 (in which a computer is used) and the motor 341 which rotates the rotary color filter 331 as shown in FIG. 32. In this embodiment, the rotary color filter 331 has the three color filter areas corresponding to their respective lengths of illumination time. Therefore, the color filter 331 is rotated usually at a constant speed, but the comtroller 340 may be so arranged that the filter is stopped at a predetermined position in order to provide an intermittent illumination in yellow at night, for example. The controller 340 can also be used to control the light source 330. It is possible to supply a power to the light source 330 intermittently in order to provide an intermittent lighting when the time of blue lighting, for example, has come near to end.

Therefore, if the light source 330 is installed on the ground in this embodiment, it can be replaced very simply and safely. Also, if the apparatus is so constructed that the light is supplied as changed in color to a single light-emitting portion 336, the space of installation can be reduced to about one third of the conventionally required space. Namely, the apparatus according to the present invention has an excellent effect in practice.

(Nineteenth Embodiment)

Figure 35:
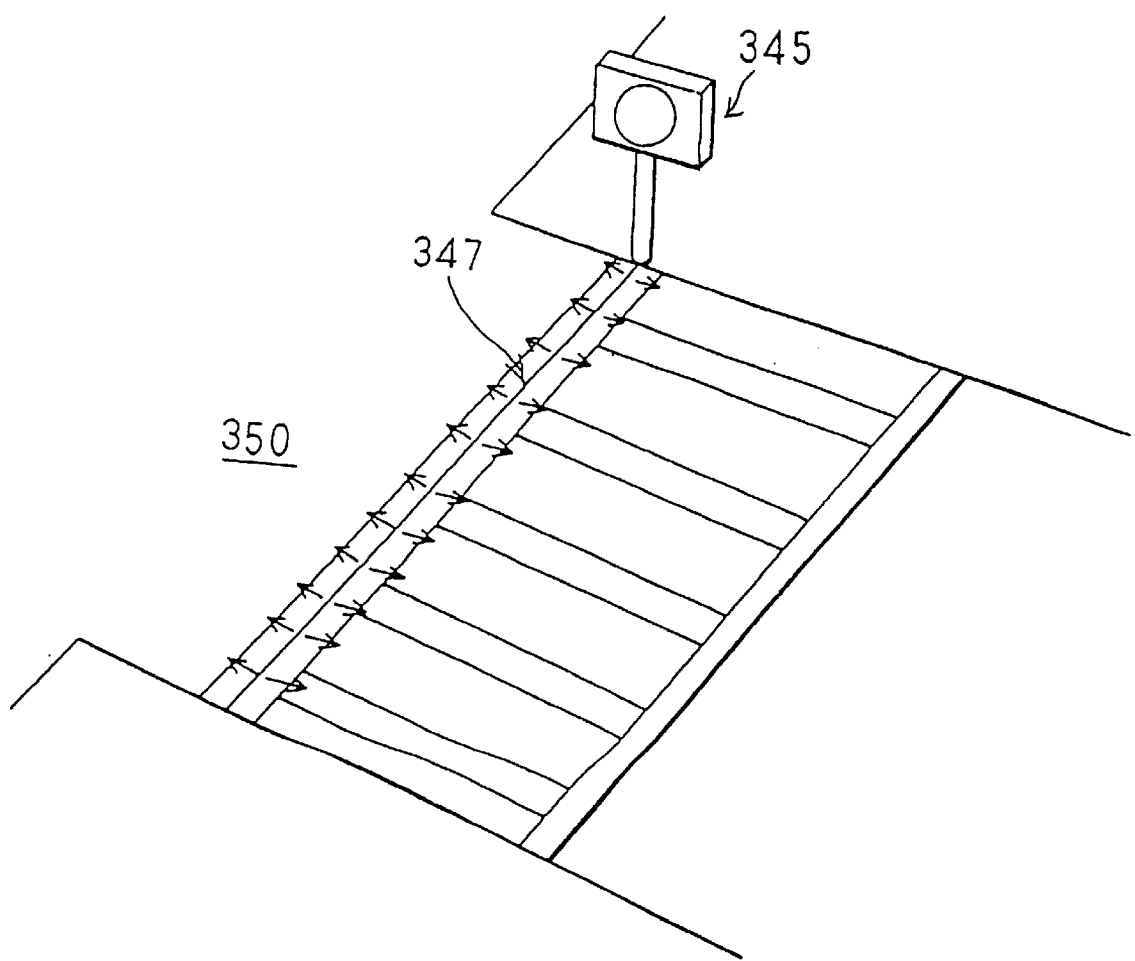
FIG. 35 is a perspective view of a nineteenth embodiment of the waterpoof lighting apparatus according to the present invention, showing the application thereof in a cross-walk.
Figure 36:
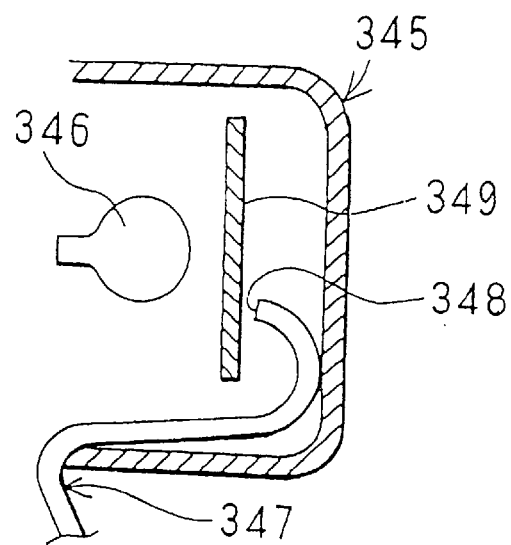
FIG. 36 is a sectional view showing an example of the installation of the light transmission hose in the signal in FIG. 31.

FIG. 35 shows the nineteenth embodiment of the present invention, applied for a walker's go-step signal provided along a pedestrians' crossing. According to this embodiment, the signal 345 comprises a light source 346 (see FIG. 36) and a light transmission hose 347. The hose 347 is to convey the light from the source 346 and laid as buried along the pedestrians' crossing on a road 350. As shown in FIG. 36, the light transmission hose 347 has provided at one end thereof a light-incidence portion 346 which receives the light from the light source 346. The signal 345 has provided in front of the light 346 a filter 349 which has alternately selectable right and blue sections. The light-incidence portion 348 receives the light passing through the filter 349. When the amount of incident light is small, another light source (not shown) interlocked with the light source 346 is put into use and the light from the separate light source is received at the light-incidence portion 348. By making such an arrangement that when the light from the light source 346 is blue in color, the separate light source will also emit a blue color, the blue color can be emitted to the light transmission hose 347.

Figure 37:
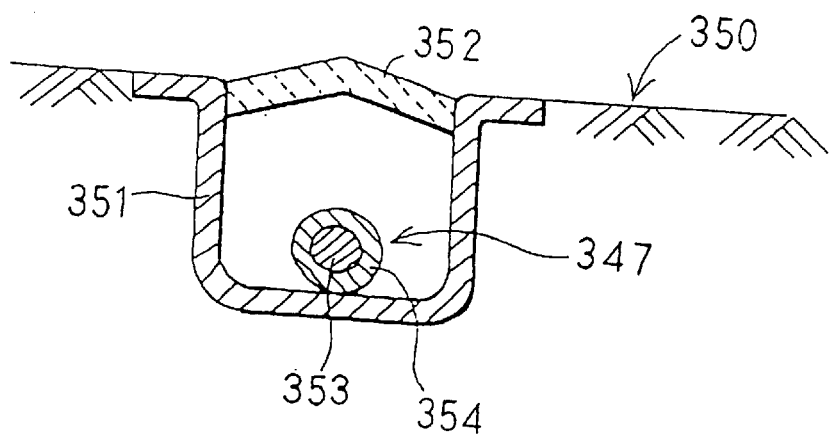
FIG. 37 is a sectional view showing an example of the disposition of the light transmission hose in the cross-walk in FIG. 35.

The light transmission hose 347 consists of a viscous-liquid, solid or gel core 353 and a flexible and transparent high-molecular clad 354 housing the core 353 and of which the index of refraction is lower than that of the core 353. The light received at the light-incidence portion 348 travels through the light transmission hose 347 and is emitted at the light-emitting portion along the length of the hose 347 to provide a same information as on the signal 345. In this embodiment, when the signal 345 lights blue, the blue light is incident upon the light-incidence portion 348, transmitted through the hose 347 and emitted from the light-emitting portion along the length of the hose 347. The light transmission hose 347 laid in a U-recess 351 formed in each of appropriate places in the road 350 within the pedestrians' crossing area as shown in FIG. 37. The U-recess is closed with a cover 352. The cover 351 is made of acryl, reonforced glass or the like which has such a rigidly that the cover is capable of withstanding the weight of a vehicle running over the recess. The transparent cover 352 is straightly continuous in shape in this embodiment. However, the shape is not limited to this straight continuous one but may be a split-type one.

(Twentieth Embodiment)

Figure 38:
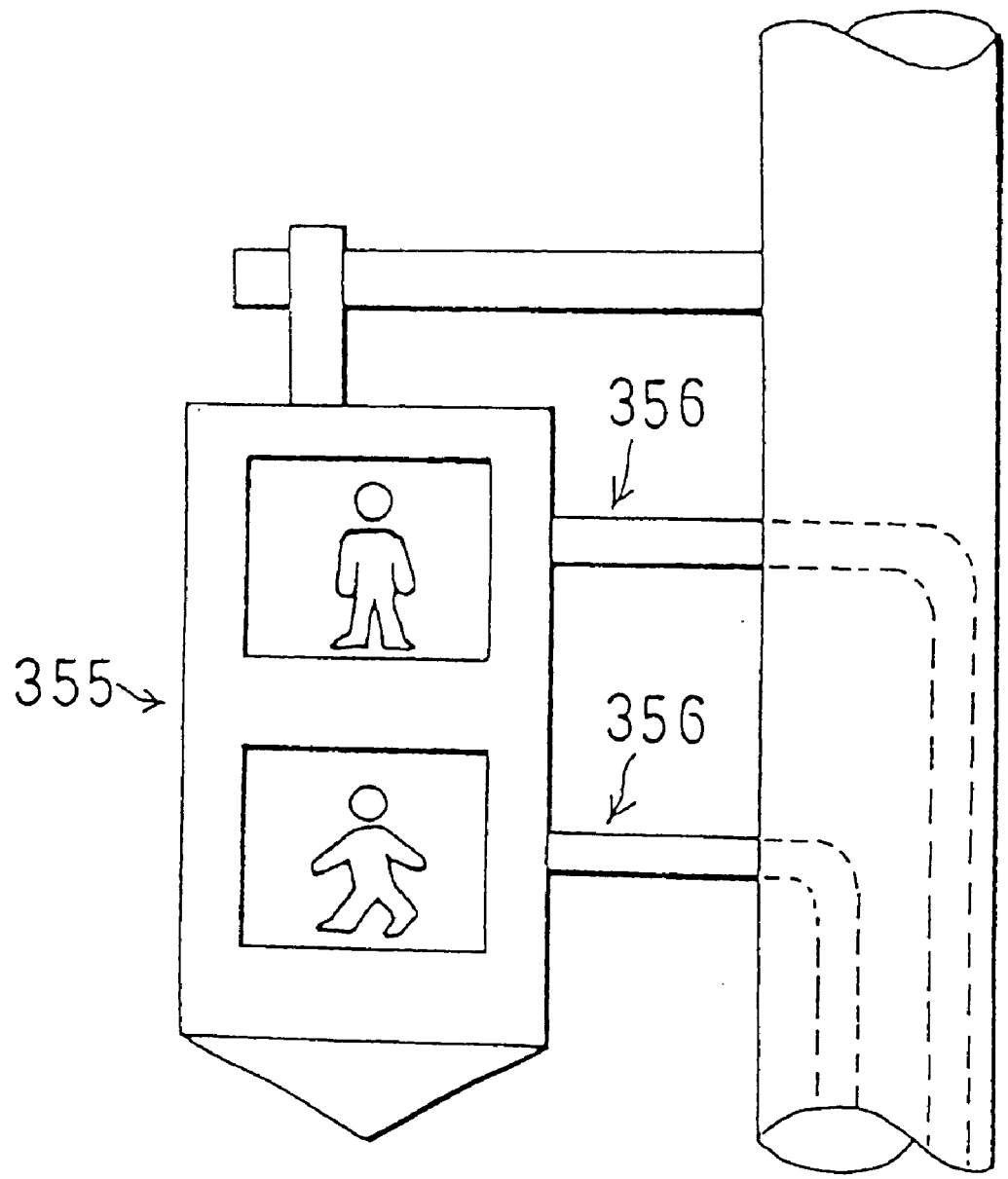
FIG. 38 is a fornt view of a twentieth embodiment of the waterproof lighting apparatus according to the present invention, showing an example of the installation and use thereof with a signal having two indicators.

FIG. 38 shows the twentieth embodiment of the present invention, also applied for a walkers' go-step signal.

The signal 355 has two light-emitting portions. In this case, it suffices to use two light transmission hoses 356. Otherwise, a signal light transmission hose 356 may be used and branched at the signal 355. Also separate light sources may be used for the two light transmission hoses, respectively.

(Twenty-first Embodiment)

Figure 39:
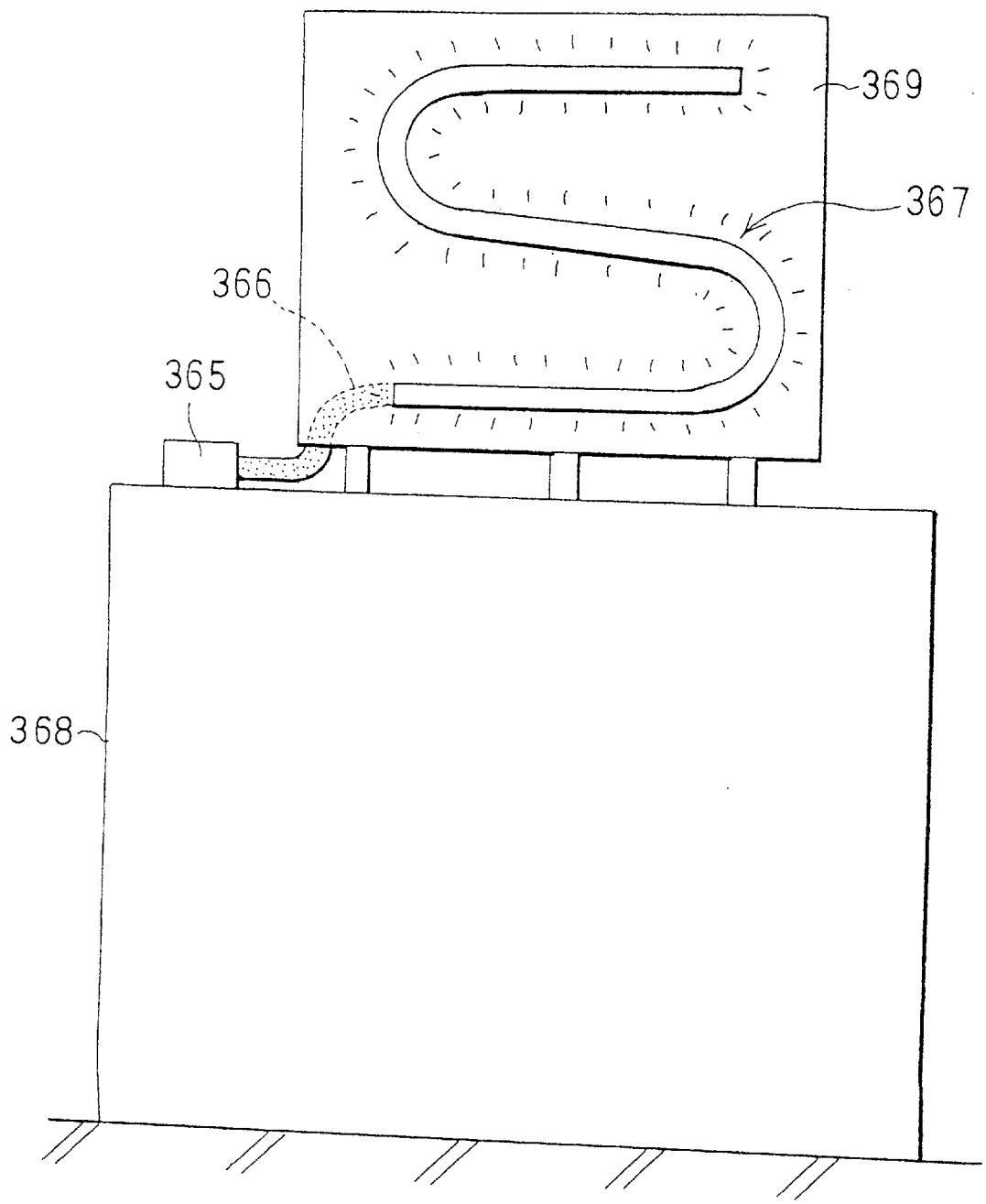
FIG. 39 is a schematic drawing of a twenty-first embodiment of the waterproof lighting apparatus according to the present invention.

FIG. 39 shows the twenty-first embodiment of the waterproof lighting apparatus according to the present invention, used on an ad-tower. The apparatus according to this embodiment comprises a light source 365, light transmission hose 366 and a light-transmitting portion 367. The assembly of these components is erected as an ad-tower on the roof of a building 368.

The light source 365 emits a light of a predetermined wavelength, more particularly, a light of a color (wavelength) showing a great effect of advertising or publicity. In this embodiment, the light source 365 uses a lamp which emits a highly bright white light. The light emitted from this lamp is reflected by a concave mirror, then incident upon a condensing lens, and thereafter condenses toward the light-incidence end of the light transmission hose 366. The light having passed through the condensing lens is changed into lights of different colors by a disk-shaped color filter conisiting of a plurality of color areas and supplied to the light transmission hose 366.

In this embodiment, a color filter is used to change and adjust the color of light. However, the present invention is not limited to this embodiment, but the lamp itself may be a colored one.

The light-emitting portion 367 is installed on a signboard 369 used as an ad-tower and it is shaped like an alphebet character "S".

(Twenty-second Embodiment)

Figure 40:
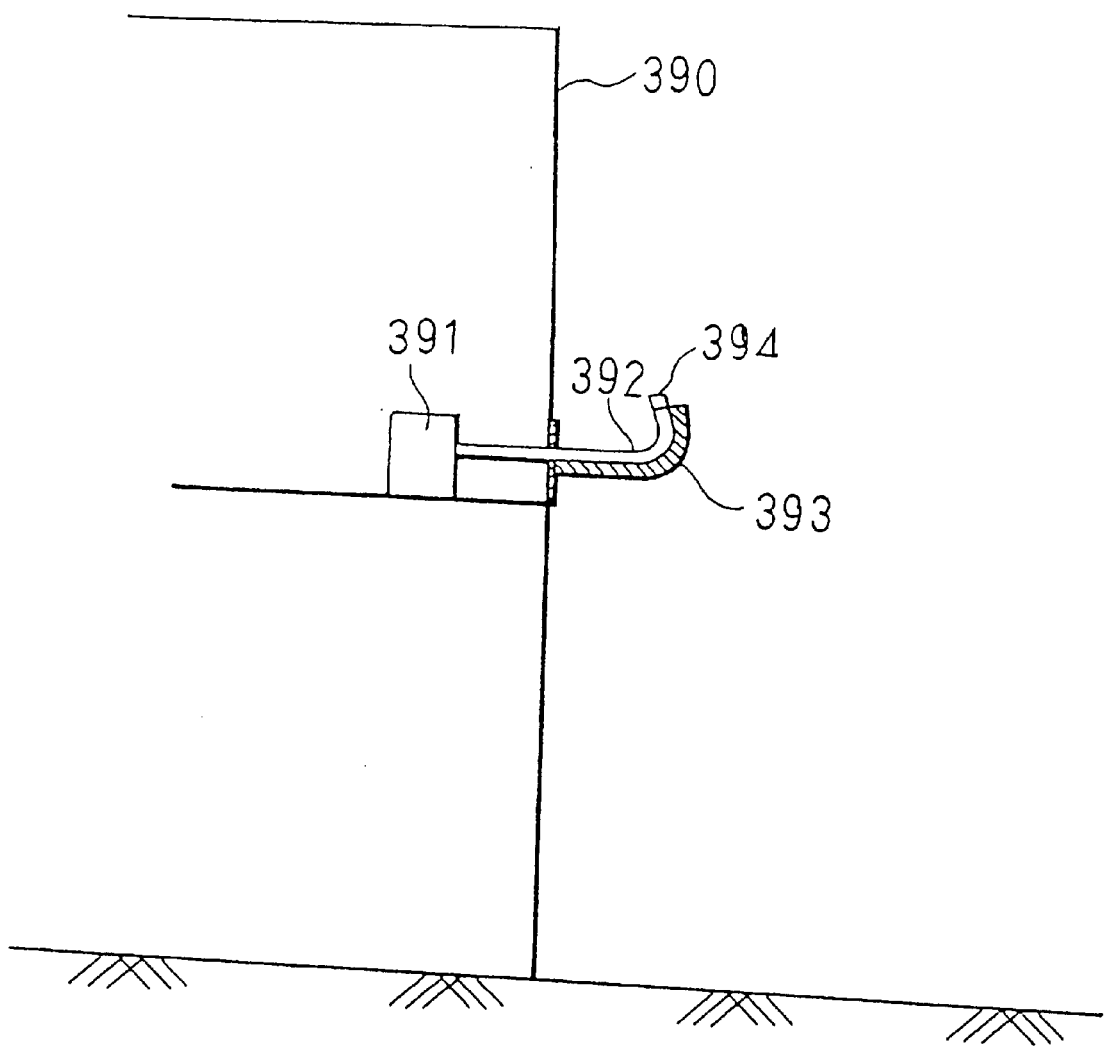
FIG. 40 is a schematic drawing of a twenty-second embodiment of the waterproof lighting apparatus according to the present invention, showing an example of the light-up of a multistoried building.

FIG. 40 shows the twenty-second embodiment of the waterproof lighting apparatus according to the present invention, applied for lighting-up of a multistoried building (outdoor structure). In this embodiment, the lighting apparatus comprises a light source 391, light transmission hose 392 and lens 394, as major components. The light source 391 is installed outside a building 390, the light transmission hose 392 is connected at one end thereof to the light source 391 while the other end is installed as directed from outside toward the building 390. The light transmission hose 392 laid outdoor is so supported on a support member 393 provided on the building that the other end of the hose 392 is directed toward the outer wall of the building 393. The lens 394 is provided at the light-emitting portion at the other end of the hose 392 to condense the light. However, a light-scattering plate may be used in place of the lens 394 to scatter the light. Also, a color filter may be provided at the light source 391 to deliver lights of different colors to the light transmission hose 392. Otherwise, a flash lamp may be used to emit light intermittently. Furthermore, the color of light, light emission interval, afterimage, etc. may be controlled by using a computer.

Note that a same material and structure as that of the core 4, clad 5, window 6, sheath 7 and protective tube 8 used in the first embodiment may be used in the sixth, eighth, ninth, fourteenth, eighteenth, twentieth, twenty-first and twenty-second embodiments as well.

It should also be noted that the light emission tube 19 in the second embodiment may also be used in the first, third, fourth, fifth, sixth, seventh, eighth, tenth, eleventh, twelfth, thirteenth, fourteenth to nineteenth and twenty-first embodiments.

Further note that the light-emitting portions 146 and 147 shown in FIGS. 7(B) and 7(C) may be appropriately installed at the free end of all the embodiments of the present invention.

The light sources usable in the present invention include the sunlight, natural light collected by a sun light follower or condensing apparatus, incandescent lamp, fluorescent lamp, halogen lamp, metal halide lamp, light-emitting diode, semiconductor or gas laser, electro luminescence emitter, plasma light emitter, etc. In all the embodiments of the present invention, the light from the light source can be appropiately changed in wavelength, wavelength zone, intensity and the like by using an optical filter such as color filter, prism, diffraction grating, phosphor, nonlinear optical element or the like. As in case of a color changer, such changes can be obtained as necessary during use of the lighting apparatus. The light source may be so designed as to emit pulsed light ot flash light, and the light may be incident upon one end or both ends of the light transmission hose.

We claim:

1. A waterproof lighting apparatus, comprising:

a light source for emitting light; and a single flexible light transmission tube connected at one end thereof to said light source so as to receive the emitted light, said tube comprising a long hollow clad formed from a flexible polymer, and a core provided inside the clad, the core being of a material having an index of refraction light transmissivity that is higher than that of the clad, said core being solid and formed from an ester acrylate or a co-polymer of it; and the light emitted from the light source being guided through the flexible light transmission tube to exit at least from a light-emitting portion provided at the other end of said tube.

2. The waterproof lighting apparatus according to claim 1, further comprising a water fountain; and wherein the light-emitting portion is provided atop said water fountain.

3. The waterproof lighting apparatus as set forth in claim 1, further comprising a waterproof housing, and wherein said light source is disposed within said housing.

4. The waterproof lighting apparatus as set forth in claim 1, wherein said clad is waterproof.

5. The waterproof lighting apparatus as set forth in claim 1, wherein the light-emitting portion of said tube is disposed in water.

* * * * *